United States Patent [19]
Sarr et al.

[11] Patent Number: 6,003,237
[45] Date of Patent: Dec. 21, 1999

[54] SEMIAUTOMATED METHOD FOR SWAGED COUPLING PROCESS VERIFICATION

[75] Inventors: Dennis P. Sarr, Kent; Thomas W. Jurick, Kirkland, both of Wash.

[73] Assignee: The Boeing Company, Seattle, Wash.

[21] Appl. No.: 08/902,726

[22] Filed: Jul. 30, 1997

[51] Int. Cl.[6] ........................................... G01B 3/26
[52] U.S. Cl. .............................................. 33/542; 33/544.3
[58] Field of Search ............................ 33/542, 544, 544.2, 33/544.3, 783, 784, 827

[56] References Cited

U.S. PATENT DOCUMENTS

| | | | |
|---|---|---|---|
| 3,762,059 | 10/1973 | Dawson | 33/174 G |
| 4,367,592 | 1/1983 | Thompson | 33/173 E |
| 4,879,819 | 11/1989 | Johntson et al. | 33/833 |

*Primary Examiner*—Bernard Roskoski
*Attorney, Agent, or Firm*—Christensen O'Connor; Johnson & Kindness PLLC

[57] ABSTRACT

A semiautomated method and system (30) for swaged coupling process verification are provided. The system nondestructively measures swage groove depth (A) of a swaged coupling (10) for a tube (20). The tube has an inner surface with a first inside diameter at a first distance from a swaged end (22) of the tube and a second inside diameter at a second distance from the swaged end of the tube that is less than the first distance. The swage groove depth is the difference between the first inside diameter and the second inside diameter. The system includes a probe case (38) and a probe (40) that extends from the probe case. The probe has a probe tip (92) that is arranged to contact the inner surface of the tube and deflect in response to changes in the inner diameter of the tube. A transducer (42) generates a signal that is indicative of the inner diameter of the tube in response to deflection of the probe tip. The signal has a first magnitude when the probe tip is at the first distance. A centering device (34) that has first and second ends is slidably received about the probe. The probe is fully inserted into the tube. The first and second ends of the centering device abut the probe case and the tube, respectively, and the probe tip contacts the inner surface of the tube at the first distance. A processor (36) that is coupled to receive the signal indicative of the inner diameter of the tube is provided. The first magnitude is recorded, and the probe tip is withdrawn from the first distance until the probe tip is within the swage groove at the second distance. The signal has a second magnitude when the probe tip is within the swage groove at the second distance and the second magnitude is recorded. The processor determines the swage groove depth from a difference between the first and second magnitudes of the signal.

19 Claims, 22 Drawing Sheets

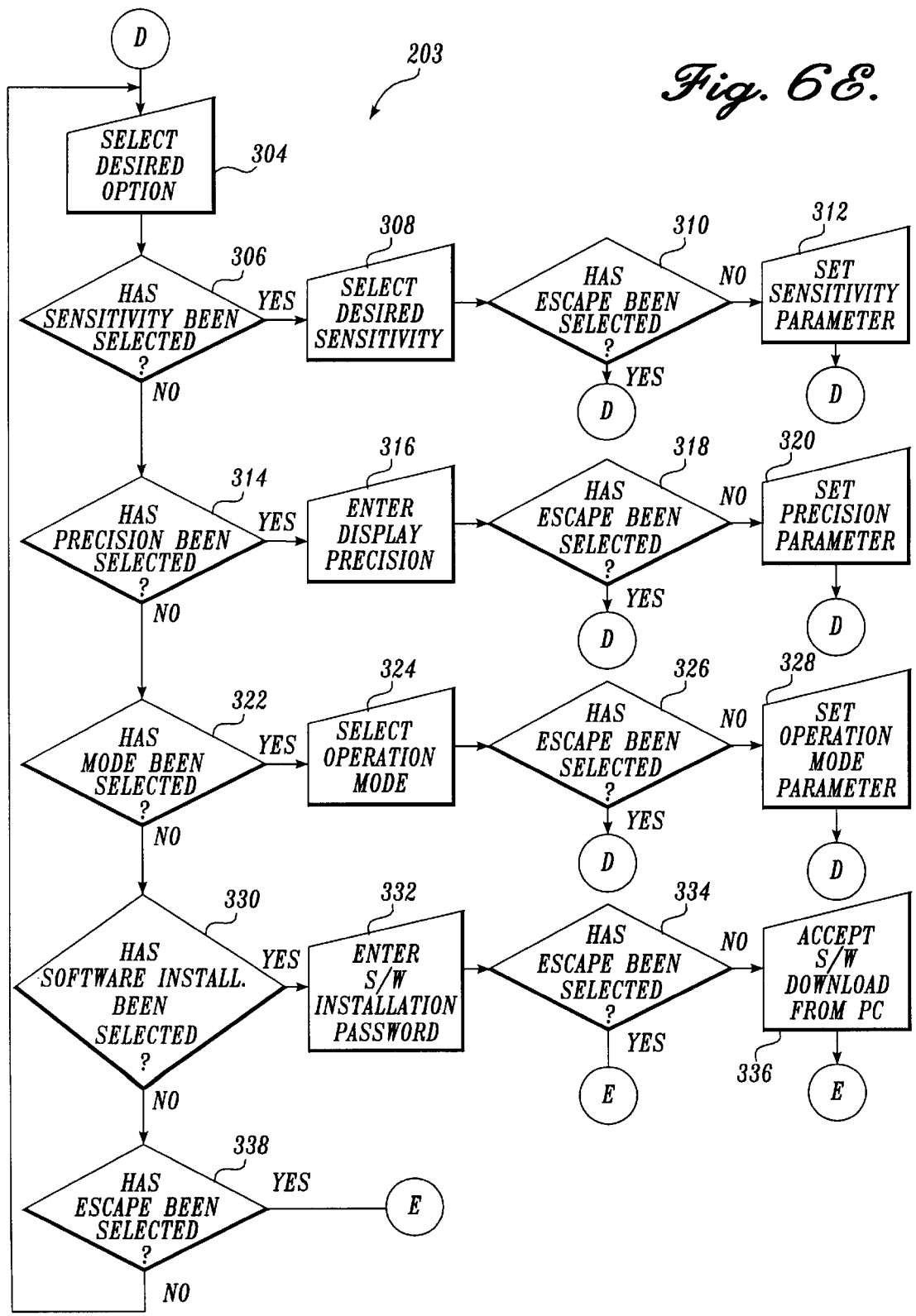

SEMIAUTOMATED METHOD FOR SWAGED COUPLING PROCESS VERIFICATION

FIELD OF THE INVENTION

The present invention relates to measurement gauges and, more particularly, to a method and system for swaged coupling process verification.

BACKGROUND OF THE INVENTION

Couplings, such as sleeves and unions, are widely used as fittings for tubes. In a typical joint between two tubes, a sleeve is swaged to a tube and a union is swaged to another tube. The sleeve fits inside the union and is held in the union with a hold-down nut in order to join the tubes. Thus, the integrity of the joint depends in part on the quality of the swaging of the sleeve and union on the respective tubes.

FIG. 1 shows a cross-sectional view of a typical swaged coupling. A coupling 10 has a first end 12 and a second end 14. The first end 12 includes a first coupling groove 16 and a second coupling groove 18. The first and second coupling grooves 16 and 18 typically have a same coupling groove depth. The second end 14 has a substantially constant inner diameter.

The coupling 10 is swaged onto a tube 20 at a first end 22 of the tube. In a typical swaging process, an elastomeric swaging tool (not shown) is used to attach the coupling 10 onto the tube 20. The swaging tool presses and deforms the tube 20 into the first and second grooves 16 and 18 of the coupling 10. First and second swage grooves 24 and 26 of the tube each have a swage groove depth A that is the difference between the inner diameter of the tube 20 measured in the first coupling groove 16 or the second coupling groove 18 and the inner diameter of the tube 20 measured adjacent to the second end 14 of the coupling 10.

The swage groove depth A determines the quality of the attachment of the coupling 10 to the tube 20. If the elastomeric swaging tool operates at an excessive pressure, the swage groove depth A will be too great. This can result in a stress-crack failure of the coupling 10 in the vicinity of the first or second coupling grooves 16 or 18. On the other hand, if the elastomeric swaging tool operates at an insufficient pressure, then the swage groove depth A will be too small. This can result in fluid leaking past the coupling 10 and out of the tube 20. It will be appreciated that, over time, leakage can worsen as the fluid in the tube 20 is heated and cooled and the fluid system is pressurized and depressurized. In applications subject to shock and vibration, such as in aircraft systems, the coupling 10 can separate from the tube 20, causing rapid fluid loss and possible failure of an associated system.

Further, the condition of the elastomeric swaging tool degrades over time. Thus, the elastomeric swaging tool can operate at a pressure other than the pressure set by the operator. Therefore, the quality of the attachment of couplings 10 to tubes 20 can deteriorate over time.

This can result in an increased number of failures. In order to timely detect swage groove depths that may be out of specification, it would be desirable to nondestructively measure the swage groove depth A during the swaging process. Nondestructive evaluation techniques have been used in a number of other industrial applications. For example, nondestructive evaluation techniques using a probe and a transducer have been applied to hole profile gauging systems. See U.S. Pat. No. 5,010,658 ("the '658 patent"). In the '658 patent, a probe senses deviations in the contour of the inner surface of a bore while the probe is retracted through the bore. A profile gauge includes a processing unit that samples the output from the probe, develops a profile for the hole, and evaluates whether the profile is within predetermined tolerance limits. The probe includes a split-ball probe coupled with a transducer, and the probe is retracted through the bore by a spring coupled with a damping device. Because the split-ball probe has only two fingers, centering of the probe cannot be ensured. Thus, accuracy of measurements depends on the skill of the operator. Further, the spring and damping device prevent the operator from receiving tactile feedback information regarding centering of the probe. Measurement gauges have also been adapted for measuring depth of holes for fasteners. See U.S. Pat. Nos. 5,189,808 and 4,112,355.

However, in-process measuring systems known in the prior art have been unable to nondestructively measure swage groove depth. In addition to the shortcomings discussed above, prior art nondestructive measurements are not readily repeatable because a consistent starting point for measurement is not provided. Because these problems have not been overcome by the prior art, the only process verification known in the prior art for the swaging process is via destructive evaluation. Typically, a swaged coupling is cut cross-sectionally and the swage groove depth A is manually measured for an entire lot of swaged couplings. The cross section is typically mounted with plastic, the surfaces are polished, and edge surfaces of the cross section are evaluated with a microscope.

The destructive evaluation process is time consuming, expensive, and statistically inappropriate. For example, if the destructively evaluated sample is within a predetermined specification, then the entire lot is accepted. This can result in the acceptance of swaged couplings in the lot that may have a swage groove depth A outside the predetermined specification. On the other hand, if the swage groove depth A is outside the predetermined specification, then the entire lot is rejected. This can result in the rejection of many couplings in the lot that may have a swage groove depth A within the predetermined specification.

The present invention is directed to providing a semiautomated system and method for swaged coupling process verification that overcome the foregoing and other disadvantages of destructive evaluation as well as in-process measurement devices for other applications. While designed for use in the verification of swaged couplings intended for use in aircraft systems, it is to be understood that the process verification in accordance with the present invention may also find use in other environments, including shipboard applications, military applications, and other industrial applications.

SUMMARY OF THE INVENTION

In accordance with this invention, a semiautomated method and system for swaged coupling process verification are provided. The system nondestructively measures swage groove depth of a swaged coupling for a tube. The tube has an inner surface with a substantially constant first inside diameter at a first distance from a swaged end of the tube, and a second inside diameter within the swage groove at a second distance from the swaged end of the tube that is less than the first distance. The swage groove depth is the difference between the first inside diameter and the second inside diameter.

The system includes a probe case. A probe is inserted into the probe case and extends from the probe case. The probe has a probe tip that is arranged to contact the inner surface of the tube, and the probe deflects in response to changes in the inner diameter of the tube. A transducer generates a signal that is indicative of the inner diameter of the tube in response to deflection of the probe, and the signal has a first magnitude when the probe tip is at the first distance. A centering device that has first and second ends is slidably received about the probe. The probe is fully inserted into the tube. The first and second ends of the centering device abut the probe case and the tube, respectively, and the probe tip contacts the inner surface of the tube at the first distance. A processor is coupled to receive the signal indicative of the inner diameter of the tube. The first magnitude is recorded, and the probe tip is withdrawn from the first distance until the probe tip is within the swage groove at the second distance. The signal has a second magnitude when the probe tip is within the swage groove at the second distance, and the second magnitude is recorded. The processor determines the swage groove depth from a difference between the first and second magnitudes of the signal.

In accordance with more detailed aspects of this invention, the probe includes a split-tip probe and a needle. Deflection of the probe is measured with a linear variable differential transformer that is mechanically coupled to the needle.

In accordance with another aspect of the present invention, the centering device includes a centering shaft that is suitably a hollow, cylindrical shaft that fits between the probe and the tube to provide partial radial alignment. The centering device further includes a zeroing stop that is suitably a hollow, substantially cylindrical plug that is slidably received about the centering shaft for providing additional radial alignment and for positioning the probe tip to provide consistent readings.

In accordance with further aspects of the present invention, the processor is housed within a portable, hand-held unit that is electrically coupled to the probe. The system includes means for zeroing a reference inner diameter at the first distance and means for recording the inner diameter within the swage groove at the second distance.

In accordance with still further aspects of the present invention, the portable, hand-held unit includes a data interface. A separate processor, such as a personal computer, is optionally coupled to the data interface for performing additional functions, such as trend analysis.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIGS. 6A through 6G are flowcharts of a preferred software routine of the present invention.

DETAILED DESCRIPTION OF THE PREFERRED EMBODIMENT

Figure 1:
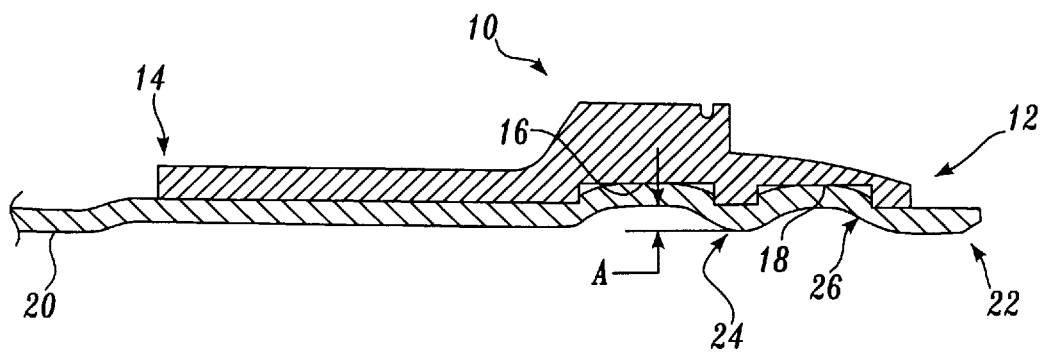
FIG. 1 is a cross-sectional view of a typical prior art swaged coupling.
Figure 2:
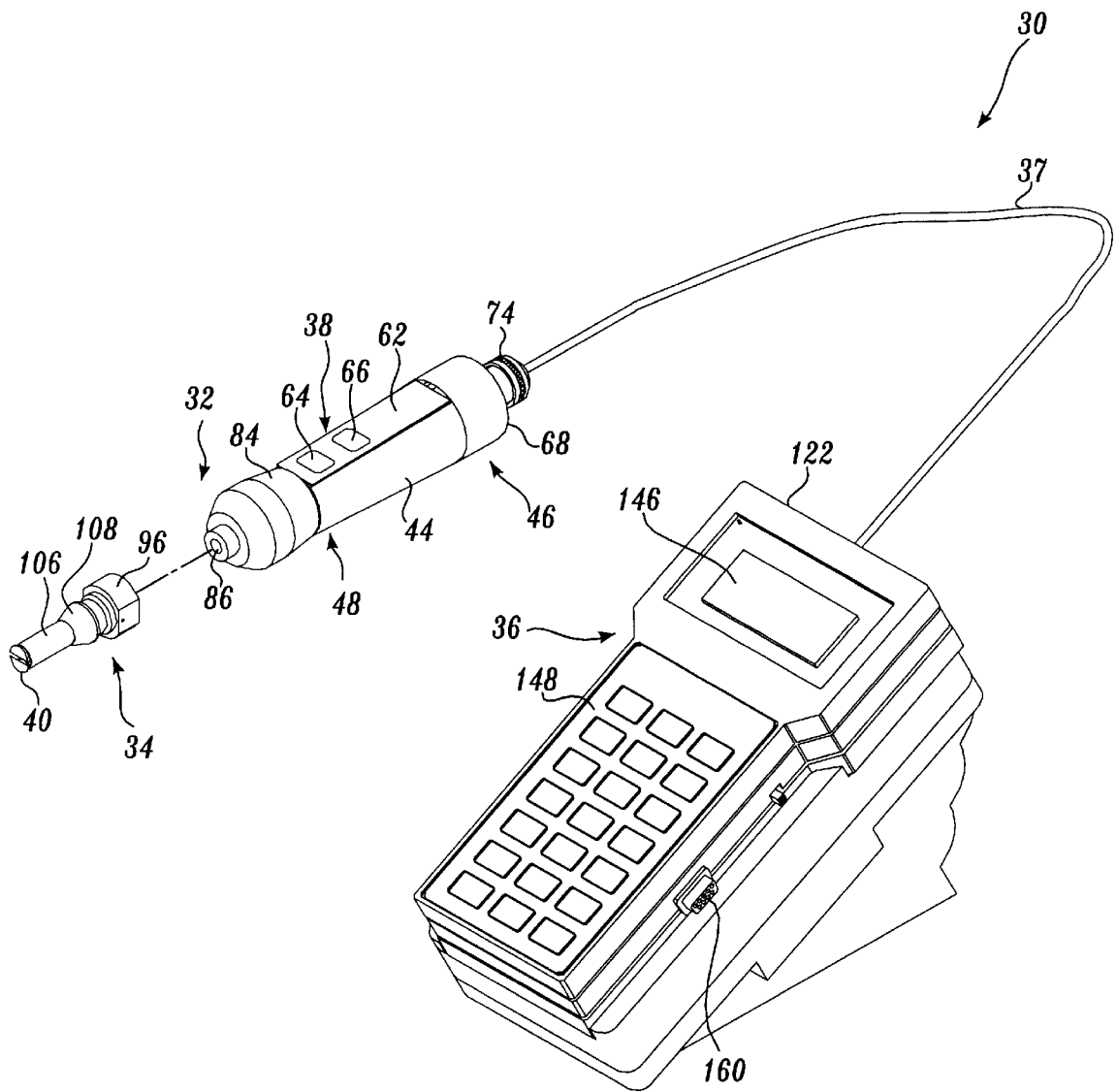
FIG. 2 is a perspective view of a system for swaged coupling process verification according to the present invention.

FIG. 2 shows a system 30 for swaged coupling process verification in accordance with the invention. The system 30 includes a probe subsystem 32, a centering device 34, and a processor subsystem 36 that is electrically connected to the probe subsystem 32 by a cable 37. The probe subsystem 32, the centering device 34, and the processor subsystem 36 function together to provide a semiautomated system for swaged coupling process verification that ensures accurate in-process measurement of swage groove depth of a swaged coupling.

In general, an operator slides the centering device 34 over a probe 40, and attaches the centering device 34 and probe 40 to a probe case 38. The operator fully inserts the probe 40 into the swaged end of a tube until a zeroing stop 108 of the centering device 34 abuts against the tube and the probe case 38, thus preventing further insertion of the probe 40 into the tube. Tips of the probe 40 are biased apart from each other and contact the inner surface of the tube. The lateral displacement of the tips of the probe is translated to a longitudinal displacement that causes a transducer to generate a signal that is indicative of the inner diameter of the tube. The operator depresses a button 64 on the probe case 38 and records this measurement. The operator then retracts the probe 40 from the fully inserted position toward the end of the tube. Tactile feedback informs the operator when the tips of the probe 40 are within the swage groove. The tips of the probe 40 are further biased apart from each other and contact the surface of the tube within the swage groove. The transducer generates a signal that is indicative of the inner diameter of the tube within the swage groove. The operator depresses a button 66 and records the measurement of the inner diameter within the swage groove. The processor system 36 determines the swage groove depth from the difference between the inner diameter of the tube at the swage groove and the inner diameter of the tube at the point where the probe 40 is fully inserted. The swage groove depth is displayed on a display device 148.

Probe Subsystem

Figure 3:
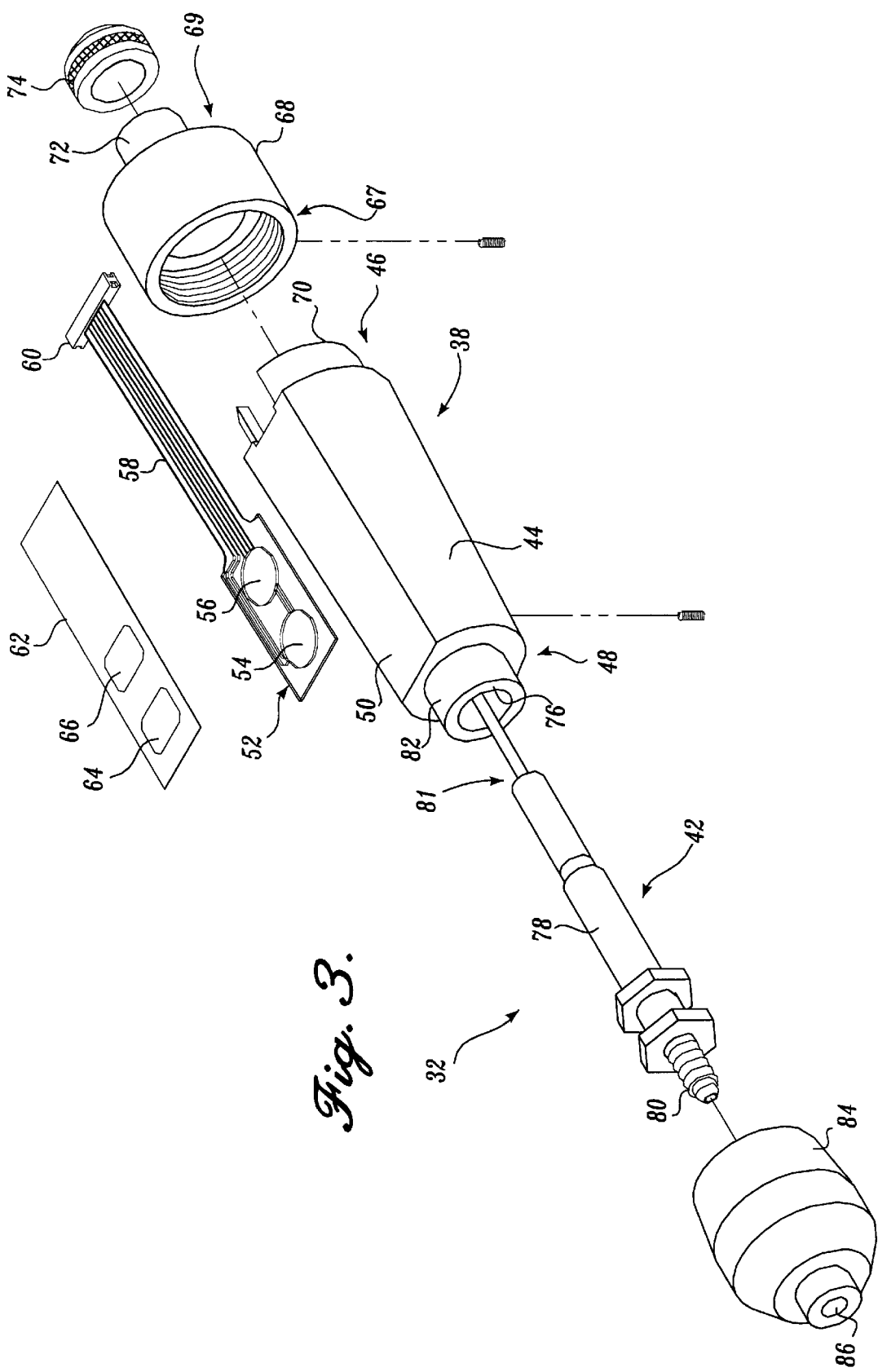
FIG. 3 is a perspective view of a component of the system of FIG. 2, namely, a probe case, with parts shown in exploded relationship.

Referring to FIGS. 2 and 3, the probe subsystem 32 includes a probe case 38, a probe 40 carried by the case, and a transducer 42 (FIG. 3) fitted inside the case and coupled to the probe. The probe case 38 includes a generally cylindrical body 44. The cylindrical body 44 is tapered from a first end 46 to a second end 48 to enable an operator to easily grasp and hold the probe case 38 with one hand while measuring swage groove depth. The generally cylindrical body 44 is suitably made of a lightweight material, such as Delrin.

Body 44 includes a flat surface portion 50 upon which a keypad 52 is mounted. The keypad 52 suitably includes first and second momentary-contact pushbutton switches 54 and 56. The first and second momentary-contact pushbutton switches 54 and 56 are electrically coupled to a ribbon cable 58 that terminates in a ribbon cable connector 60. The first and second momentary-contact pushbutton switches 54 and 56 preferably provide tactile feedback to an operator regarding the positioning of the first and second momentary-contact pushbutton switches 54 and 56. The keypad 52 is suitably a Xymox keypad Model No. 14902.

The keypad 52 and the ribbon cable 58 are covered with a label 62. The label 62 includes first and second switch covers 64 and 66 that cover the first and second momentary-contact pushbutton switches 54 and 56, respectively. The first and second switch covers 64 and 66 are suitably made of a flexible material that permits the operator to depress the first and second momentary-contact pushbutton switches 54 and 56. The first and second switch covers 64 and 66 are each suitably labeled with a function for which the first and second momentary-contact pushbutton switches 54 and 56, respectively, provide control signal paths through the ribbon cable 58 to the processing subsystem 36. As will be discussed in detail below, the first switch cover is suitably labeled "ZERO" and the second switch cover 66 is suitably labeled "REC".

A cap 68 having a first end 67 and a second end 69 is threadably attached at its first end 67 to a reduced-diameter stub portion 70 of the probe case 38 that extends axially from the first end 46 of the probe case 38. The cap 68 is suitably made from Deirin. The cap 68 includes a portion 72 that extends axially away from the second end 69 of the cap 68. An end cap 74 is attached to the portion 72. The end cap is suitably made from Delrin, and includes an aperture to serve as a grommet for protecting the cable 37 from chafing.

Figure 3A:
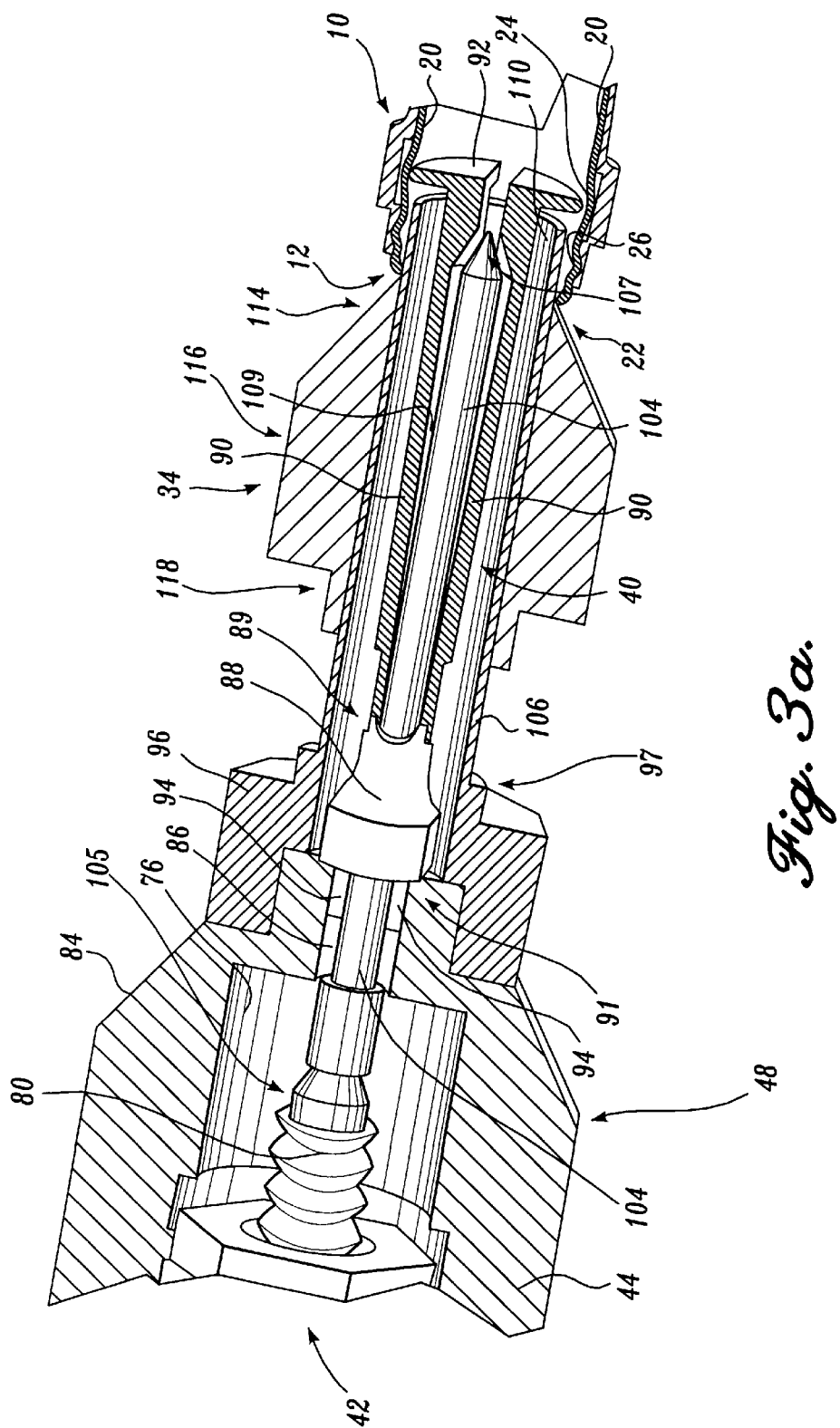
FIG. 3A is a cutaway, perspective view of a portion of the system of FIG. 2 in use.

With reference to FIGS. 3 and 3A, the transducer 42 is contained within the central cavity 76 of the body 44. The transducer 42 is preferably a linear variable differential transformer (LVDT). An example of an acceptable LVDT is a Lucas LVDT Model No. LBB375TA-100. The transducer 42 has a body 78, a bellows-like tip 80, and an end 81. A movable slug within the core of the transducer 42 is mechanically coupled to the inside of the tip 80. A needle 104 has a first end 105 that is arranged to contact the end of the tip 80 and a tip 107 that suitably narrows to a point. As will be discussed below, the needle 104 moves longitudinally in response to radial deflection of the tip of the probe 40. Longitudinal movement of the needle 104 causes the tip 80 to move, thereby causing the slug to move within the core of the transducer. Movement of the slug alters the permeability within the transducer 42 and electrically unbalances the transducer 42. When the transducer 42 is electrically unbalanced, the transducer 42 generates an electrical signal, provided to the processor subsystem 36 via the cable 37, that is indicative of the inner diameter of the tube. An end cap 84 is slidably received onto the second end 48. The end cap 84 includes a bore 86 that extends axially through the end cap 84.

Figure 4:
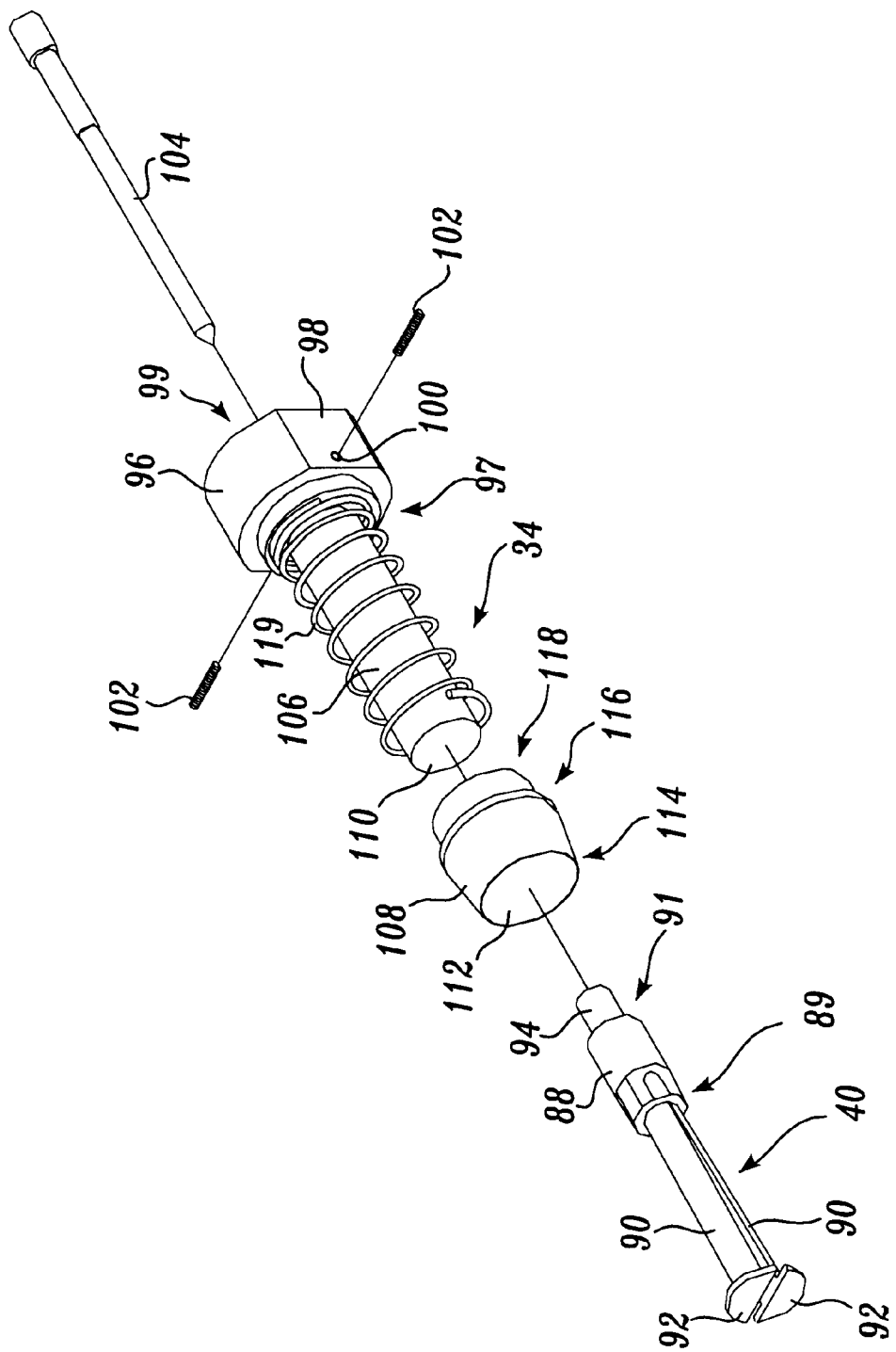
FIG. 4 is a perspective view of a centering device according to the present invention with parts shown in exploded relationship.

Referring now to FIGS. 3A and 4, the probe 40 is suitably a split-tip probe, available in varying sizes from the Diatest Company. The probe 40 includes a probe base 88 with first and second ends 89 and 91. Fingers 90 axially extend from the first end 89 of the probe base 88, and semicircular portions 92 project normally from the ends of the fingers 90. The probe 40 is prestressed during manufacture such that the fingers 90 are biased away from each other, as is well known. An inside surface of each of the fingers 90 includes a channel 109 that is shaped to receive the needle 104. Each of the channels 109 narrows to a point that is located toward the semicircular projection 92. A cylindrical portion 94 projects axially from the second end 91 of the probe base 88. The diameter of the cylindrical projection 94 is smaller than the diameter of the probe base 88.

Still referring to FIGS. 3A and 4, the centering device 34 includes a probe retaining cap 96 having an axial through bore. The probe retaining cap 96 includes first and second ends 97 and 99. The side of the probe retaining cap 96 includes diametrically opposed, flat surface portions 98. The flat surface portions 98 each include a hole 100 that extends radially inward through the probe retaining cap 96 to the axial bore. A set screw 102 is inserted in each hole 100 for retaining the probe 40 in the probe retaining cap 96 by engagement against the probe base 88.

The needle 104 is inserted through the bore in the probe retaining cap 96 from the second end 99, into the end of the cylindrical portion 94, and into the channels 109. The tip 107 of the needle 104 comes to a rest near the tip of the channels 109. When the probe retaining cap 96 is attached to the probe case 44, the end 105 of the needle 104 is held in place between the end of the bellows-like tip 80 of the transducer 42 and the tip of the channels 109. When the semicircular projections are moved within a tube under test from an area with a smaller inner diameter to an area with a larger inner diameter, the bellows-like tip 80 biases the needle 104 away from the transducer 42 and toward the semicircular projections 92 such that the semicircular projections 92 radially deflect away from each other. Conversely, when the semicircular projections 92 are radially pushed toward each other such as when the semicircular portions 94 are moved from a larger diameter area of the tube to a smaller diameter area of the tube, the fingers 90 are pushed toward each other, and the tip of the channels 109 pushes the needle 104 toward the transducer 42. The movement of the needle 104 pushes the bellows-like tip 80 toward the transducer 42 and, as discussed above, movement of the bellows-like tip 80 causes the slug to move within the core of the transducer 42. The needle 104 is thus interposed between the probe 40 and the transducer 42 for communicating to the transducer 42 the translated radial displacement of the semicircular portions 92 of the probe 40. An acceptable needle 104 is available in various sizes from the Precise Tool and Gage Co. The needle 104 has a diameter that is smaller than the diameters of the base in the probe retaining cap 96 and the cylindrical portion 94 to permit the needle 104 to move freely.

Centering Device

Still referring to FIGS. 3, 3A, and 4, the centering device 34 includes a centering shaft 106 and a zeroing stop 108. The centering shaft 106 is a hollow, cylindrical shaft that is suitably made from a lightweight material, such as Deirin. The centering shaft 106 extends axially from the first end 97 of the probe retaining cap 96. The centering shaft 106 includes a bore 110 that extends the length of the centering shaft 106. The inner diameter of the bore 110 is sized to receive the probe 40, and the outer diameter of the bore 110, that is, the diameter of the centering shaft 106, is sized such that the centering shaft 106 is receivable within the tube under test. Thus, the centering shaft 106 is selected such that its outer diameter is smaller than the inner diameter of the tube under test. However, it will be appreciated that the outer diameter of the centering shaft 106 is as close as possible to the inner diameter of the tube under test. This allows the centering shaft 106 to help maintain the semicircular portions 92 oriented as normal as possible to the inner surface of the tube, i.e., with the centering shaft and tube aligned coaxially, thereby maximizing accuracy of swage groove depth measurements.

The zeroing stop 108 is a hollow, substantially cylindrical plug that limits insertion of the probe 40 into the tube under test, so that the depth of insertion is the same each time a test is begun. This permits the semicircular portions 92 to be inserted to a substantially same distance each time it is desired to determine a reference, or zero, measurement as part of swage groove depth determination. The sizes of the zeroing stop 108 and the centering shaft 106 vary according to a desired application. For example, a sleeve is typically longer than a union associated with the sleeve. Therefore, the centering shaft 106 and the zeroing stop 108 for a sleeve are suitably longer than the centering shaft 106 and the zeroing stop 108 for an associated union. The zeroing stop 108 includes a bore 112 with an inner diameter that is sized so the zeroing stop 108 is received about the centering shaft 106. The zeroing stop 108 has a first end 114, a middle section 116, and a second end 118. The outer diameter of the first end 114 of the zeroing stop 108 is sized so that the first end 114 can abut against the tube under measurement. The outer diameter of the middle section 116 of the zeroing stop 108 is greater than the outer diameter of the first end 114 of the zeroing stop 108 to permit an operator to easily grasp the zeroing stop 108. The outer diameter of the second end 118 of the zeroing stop 108 is sized so that the second end 118 can abut against the first end 97 of the probe retaining cap 96. The zeroing stop 108 is suitably made of Deirin. If desired, a biasing mechanism 119, such as a spring, may be interposed between the second end 118 of the zeroing stop 108 and the first end 97 of the probe retaining cap 96 to bias the zeroing stop 108 against the tube under test, as will be discussed later.

Processor Subsystem

Figure 5:
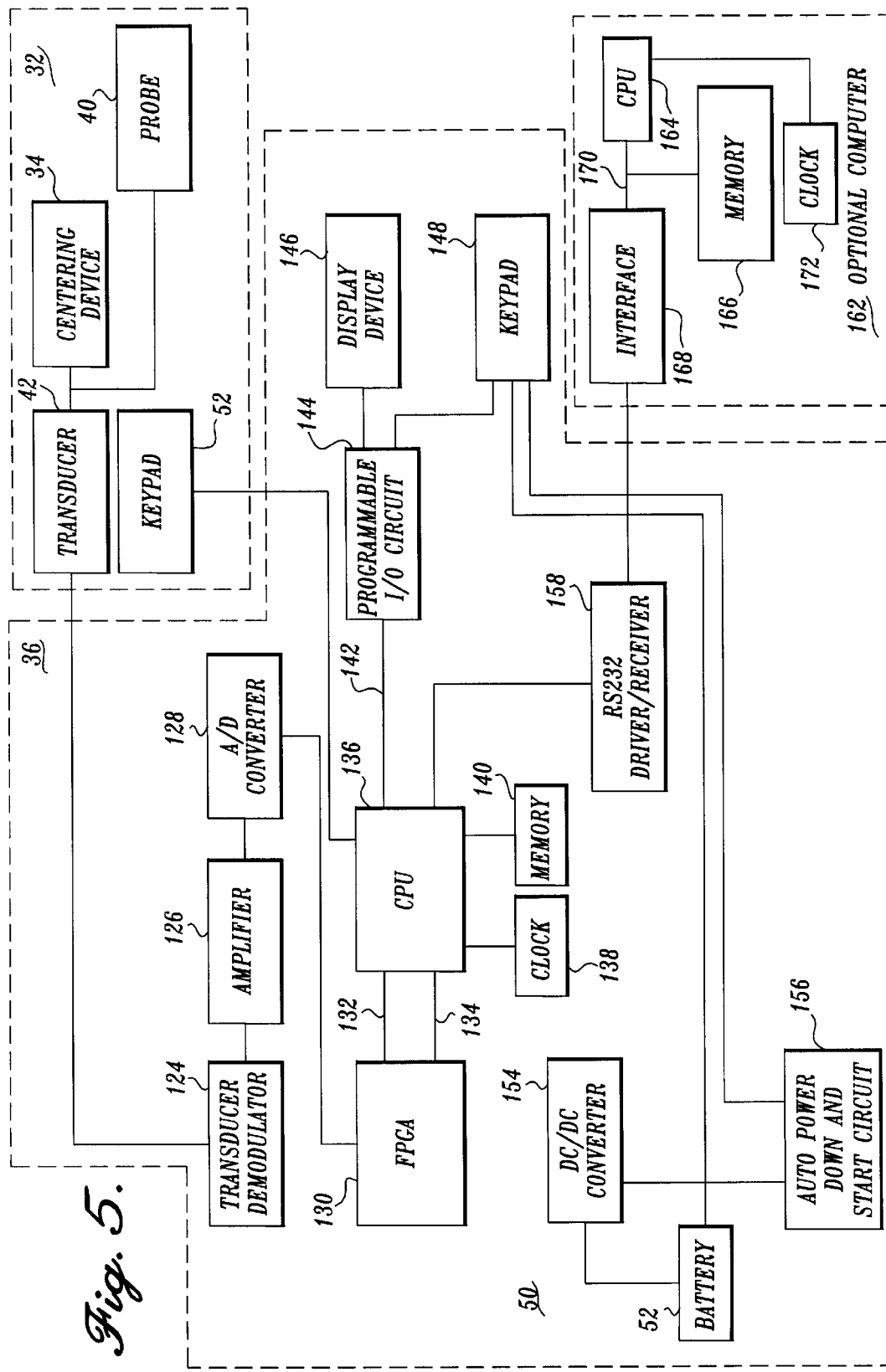
FIG. 5 is a block diagram of electronic circuitry used in the present invention.

FIG. 5 is a block diagram of electronic circuitry included in the system 30. The electronic circuitry shown in FIG. 5 is included within the probe subsystem 32, the processor subsystem 36, and an optional computer 120.

In the probe subsystem 32, the transducer 42 acts with the probe 40 and the centering device 34 to generate a signal that is indicative of the inner diameter of the tube under measurement. The output signal from the transducer 42 is an analog signal, the magnitude of which corresponds to the inner diameter of the tube. In a presently preferred embodiment, the transducer 42 is an LVDT that outputs two sinusoidal signals. As is well known, when the slug within the core of the transducer 42 is positioned such that the transducer 42 is electrically balanced, the amplitudes of the two sinusoidal signals are matched. When the slug moves laterally within the core of the transducer 42, the permeability of the transducer 42 is altered. The LVDT is no longer electrically balanced and the phase between the two sinusoidal signals shifts. This phase shift generates a differential signal that corresponds to the change in amplitude between the two sinusoidal signals resulting from the phase shift. In a presently preferred embodiment, the frequency of the two sinusoidal signals is about 5 kHz. The output from the transducer 42 is provided via the cable 37 (FIG. 2).

As discussed above, the keypad 52 includes the first and second momentary-contact pushbutton switches 54 and 56. Referring back to FIGS. 2 and 3, the keypad 52 is electrically connected to the processor subsystem 36 via the ribbon cable 58, the ribbon cable connector 60, and the cable 37.

Referring now to FIG. 2, electronic circuitry for the processor subsystem 36 is contained within a processor housing 122. The processor housing 122 is suitably made from a strong, lightweight material such as any suitable plastic.

Referring now to FIG. 5, the processor subsystem includes a transducer demodulator circuit 124 that is coupled to receive the output signal from the transducer 42. The transducer demodulator circuit 124 demodulates the output signal from the transducer 42 to provide a direct current (DC) signal. The amplitude of the DC signal is proportional to the amplitude of the differential signal that results from the phase shift between the two sinusoidal signals generated by the transducer 42. It will be appreciated that the transducer demodulator circuit 124 suitably employs any acceptable demodulation technique, the details of which are well known to those skilled in the art and are not important to an understanding of the present invention. An example of a suitable transducer demodulator circuit 124 is an NE5521D device, available from Fairchild Semiconductor Corporation.

The demodulated DC output of the transducer demodulator circuit 124 is input into an amplifier 126. The amplifier 126 is suitably configured as an operational amplifier that performs gain and integration functions on the output signal from the transducer oscillator demodulator circuit 124. A suitable amplifier 126 is a model AD711 amplifier.

The output from the amplifier 126 is input to an analog-to-digital (A/D) converter 128. A/D converters are well known in the art, and any number of suitable A/D converters may be used for the A/D converter 128. An example of a suitable A/D converter 128 is a model AD7872DIP device from Analog Devices of Norwood, Mass. The A/D converter 128 serially outputs a binary digital signal, the value of which corresponds to the amplitude of the output signal from the amplifier 126.

The serially transmitted, digital output from the A/D converter 128 is input to a field-programmable gate array (FPGA) 130. The FPGA 130 includes a serial receiver for receiving the serial digital output from the A/D converter 128. The FPGA 130 also includes a clock generator for generating a timing signal used by the processor subsystem. The FPGA 130 converts the binary signal received from the A/D converter 128 to a binary-coded-decimal (BCD) signal. The FPGA 130 preferably converts the BCD signal to an American National Standard Code For Information Interchange (ASCII) signal for subsequent processing by the processor subsystem 36. The FPGA 130 serially transmits the ASCII signals on a bus 132. It is not necessary that the FPGA 130 convert the BCD signal to an ASCII signal. In one embodiment of the present invention, the FPGA 130 suitably transmits the BCD signals as serial data on the bus 132. The FPGA 130 outputs control signals on a control signal bus 134.

The processor subsystem 36 includes a central processing unit (CPU) 136. The CPU 136 is coupled to the keypad 52, and is coupled to receive data from the bus 132 and control signals from the control signal bus 134. The CPU 136 is controlled by a clock 138. In the preferred embodiment, the CPU 136 receives the serially transmitted ASCII signals from the FPGA 130 via the bus 132. Because the FPGA 130 performs the BCD-to-ASCII conversion, the CPU 136 need not perform this conversion. Therefore, the CPU 136 need not devote processing resources to the BCD-to-ASCII conversion. Accordingly, more computational power of the CPU 136 is available for determining swage groove depth. In an alternative embodiment, in which the FPGA 130 does not perform the BCD-to-ASCII conversion, the CPU 136 receives BCD data from the data bus 132 and performs the BCD-to-ASCII conversion. When the CPU 136 performs the BCD-to-ASCII conversion, fewer processing resources are available for determining the coupling swage groove depth. Accordingly, performing the BCD-to-ASCII conversion in the CPU 136 is not preferred. The CPU 136 is well known in the art, and details of its construction and operation are well known to those skilled in the art and are not necessary for an understanding of the invention. A suitable processor that may, be used as the CPU 136 is a processor Model No. 80C188EB8, available from the Intel Corporation of Santa Clara, Calif.

The CPU 136 is coupled to a memory 140. The memory 140 includes a portion of nonvolatile memory, such as an electrically erasable programmable read-only memory (EEPROM), for storing software routines executed by the CPU 136. The software routines will be discussed in detail below. It will be appreciated that many types of nonvolatile memory are well known in the art, including read-only memory (ROM), programmable read-only (PROM), erasable programmable read-only memory (EPROM), EEPROM, and flash EEPROM. Any acceptable nonvolatile memory may be used for the nonvolatile portion of the memory 140. In one embodiment of the present invention, the nonvolatile memory is suitably a 256-Kbyte EEPROM. The memory 140 also includes a portion of volatile memory, such as random-access memory, for temporary storage of data being processed by the CPU 136.

The memory 140 also includes a portion of volatile memory, such as random-access memory (RAM). RAM is well known to those skilled in the art, and any acceptable RAM, such as dynamic RAM (DRAM) or static RAM (SRAM) may be used. For example, the volatile portion of the memory 140 may be any acceptable 128-Kbyte DRAM. Further, the memory 140 optionally includes a portion of nonvolatile RAM for maintaining time and date information during periods when the system 30 is not in use and power is removed from the processor subsystem 36. The use of nonvolatile RAM can also maintain data in the event of power fluctuations or temporary removal of electrical power to the processor subsystem 36. An example of an acceptable nonvolatile RAM is a 128-Kbyte SRAM mated with a nonvolatile RAM socket. Nonvolatile RAM sockets are well known to those skilled in the art, and further details of their construction and operation are not necessary for an understanding of the present invention. An example of an acceptable nonvolatile RAM socket is the DS1216D SmartWatch™, available from Dallas Semiconductor of Dallas, Tex.

The CPU 136 is connected to a bus 142 that is coupled to a programmable input/output (I/O) circuit 144. The programmable I/O circuit 144 provides an interface between the CPU 136 and input/output devices. Programmable I/O circuits are well known to those skilled in the art. An example of an acceptable programmable I/O circuit is an MSM82C55A-2VJS circuit, available from Oki Semiconductor. The input/output devices coupled to the programmable I/O circuit 144 include a display device 146, such as a liquid crystal diode (LCD) display. An acceptable LCD display is an Optrex DMC-16207N LCD display. The programmable I/O circuit 144 is also electrically connected to a keypad 148. The keypad 148 provides a user interface between the operator and the CPU 136. Any acceptable keypad may be used as the keypad 148. An example of an acceptable keypad is a Bopla FT90021D membrane keypad.

The processor subsystem 36 includes a power circuit 150. The power circuit 150 includes a source of electrical power, such as a battery 152. The battery 152 is coupled to a DC/DC converter 154. The output of the DC/DC converter 154 is coupled to an auto power down and start circuit 156. The auto power down and start circuit 156 is coupled to the keypad 148. The auto power down and start circuit 156 selectively connects the output of the DC/DC converter 154 in response to user-initiated commands entered at the keypad 148. DC/DC converters and auto power down and start circuits are well known to those of skill in the art, and details of their construction and operation are not necessary for an understanding of the present invention.

The CPU 136 is connected to an interface device, such as an RS232 driver/receiver 158. The RS232 driver/receiver 158 is an interface for transmitting and receiving data and control signals between the processor subsystem 136 and an optional computer. RS232 driver/receivers are well known in the art, and details of their construction and operation are not necessary for an understanding of the present invention. A suitable RS232 driver/receiver is a Maxim MAX 233 CPP device. The RS232 driver/receiver 158 is coupled to a connector 160 that is provided within the processor housing 122 (FIG. 2).

In an alternative embodiment of the present invention, an optional computer 162 performs some processing functions that are performed by the processor subsystem 36 in the preferred embodiment, as well as additional functions that are not performed by the processor subsystem 36. These functions will be discussed below.

The optional computer 162 is coupled to the connector 160 of the processor subsystem 36. The optional computer 162 includes a central processing unit (CPU) 164, a memory 166, and a communications interface 168 linked by a common bus 170. The central processing unit 164 is connected to a clock 172. The memory 166 may be any number of acceptable volatile or nonvolatile memories suitable for storing data. However, the memory 166 preferably includes a portion of nonvolatile memory to retain information stored in the memory 166 after power is removed from the optional computer 162. The communications interface 168 of the optional computer 162 is coupled to the RS232 driver/receiver 158 of the processor subsystem 36. Because computers are well known in the art, additional details of the optional computer 162 will not be discussed.

Preferred Software Routine

FIGS. 6A–6G are flowcharts of a preferred software routine according to the present invention. Referring now to FIGS. 5 and 6A–6G, the preferred software routine is stored in the nonvolatile portion of the memory 140 of the processor subsystem 36 and is executed by the CPU 136. When the preferred software routine is being performed, the keypad 148 and the display device 146 function as user interfaces with the operator. The preferred software routine permits the system 30 (FIG. 2) to be particularly well suited for measuring swage groove depth in the field as well as in a shop where the swaging process is performed.

The preferred software routine is prepared in any acceptable programming language that may be executed by the CPU 136. For example, in the embodiment of the present invention in which the CPU 136 includes an 80C188 processor, the preferred software routine is a C++ routine. However, it will be appreciated that a person having skill in the art can use any acceptable programming language for the preferred software routine, depending upon the embodiment of the CPU 136.

Figure 6A:
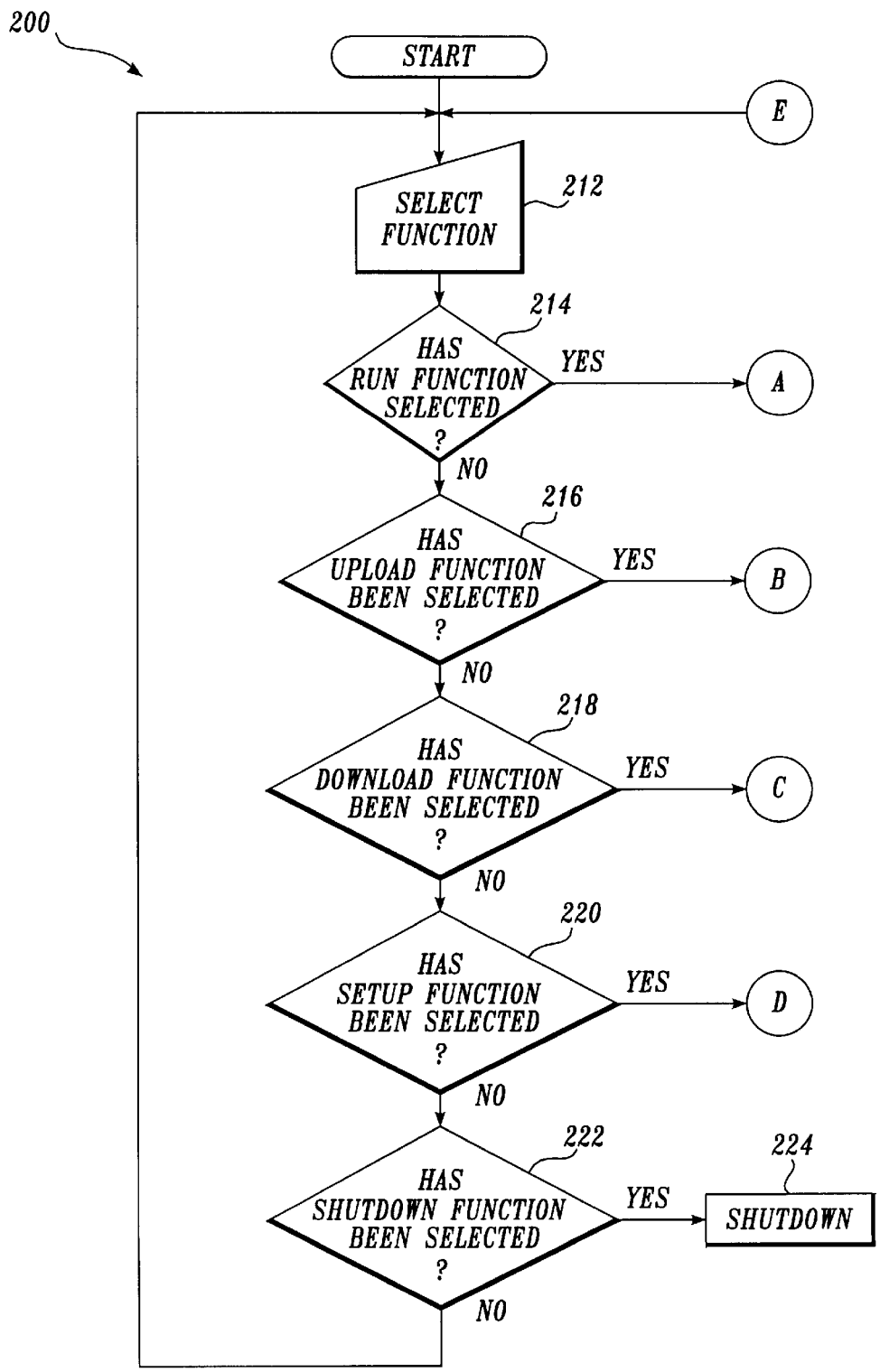
Figure 6B:
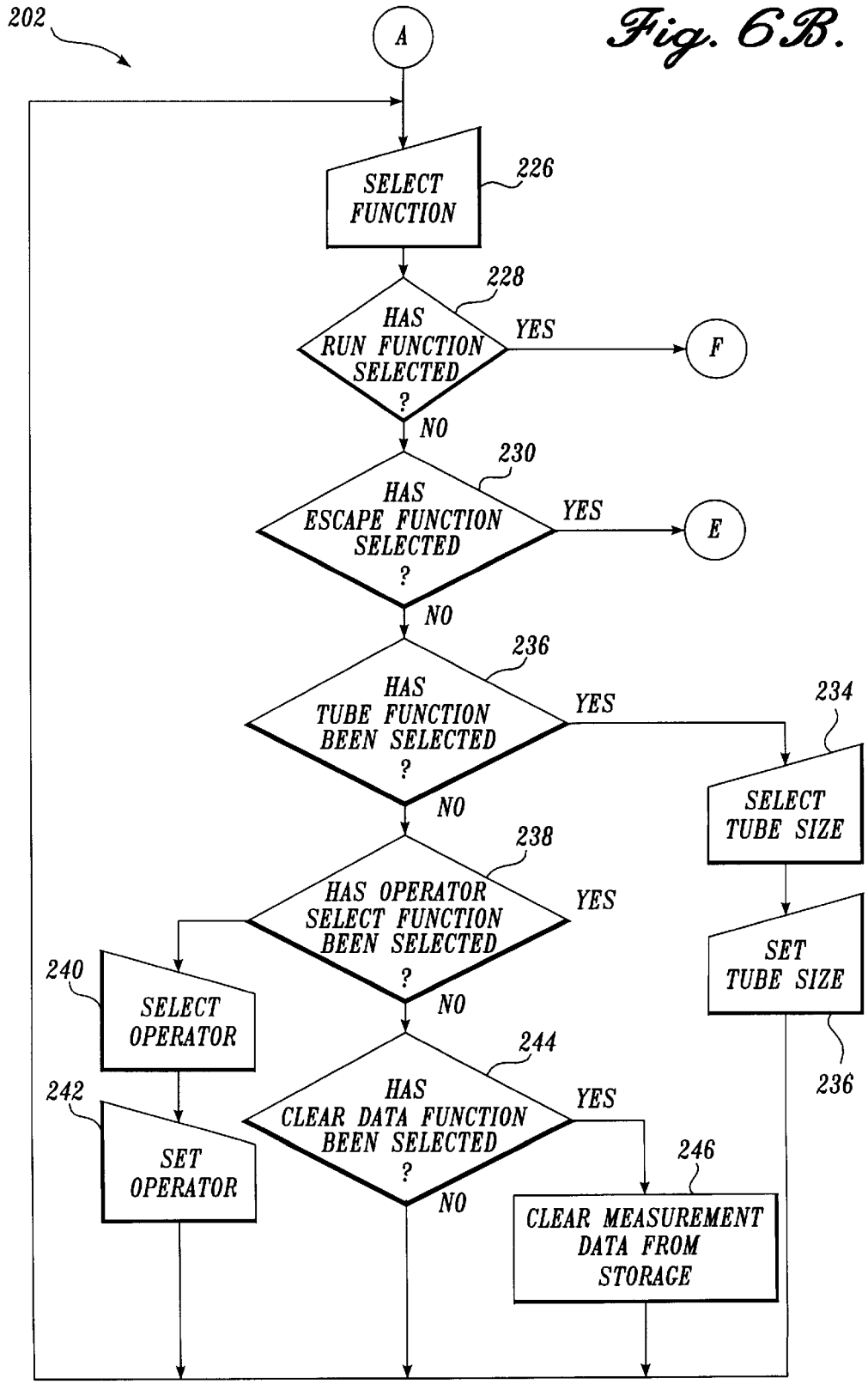
Figure 6C:
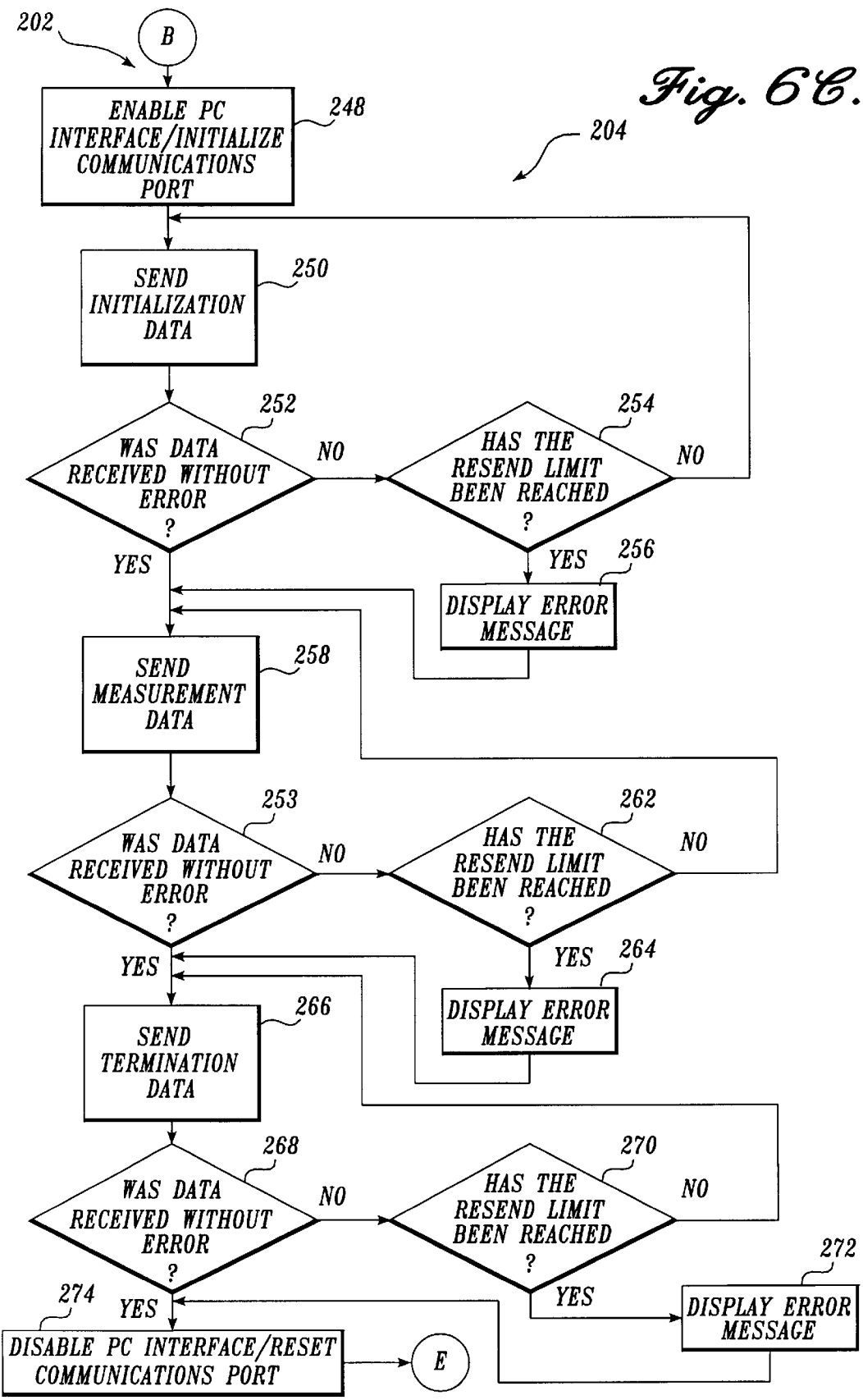
Figure 6D:
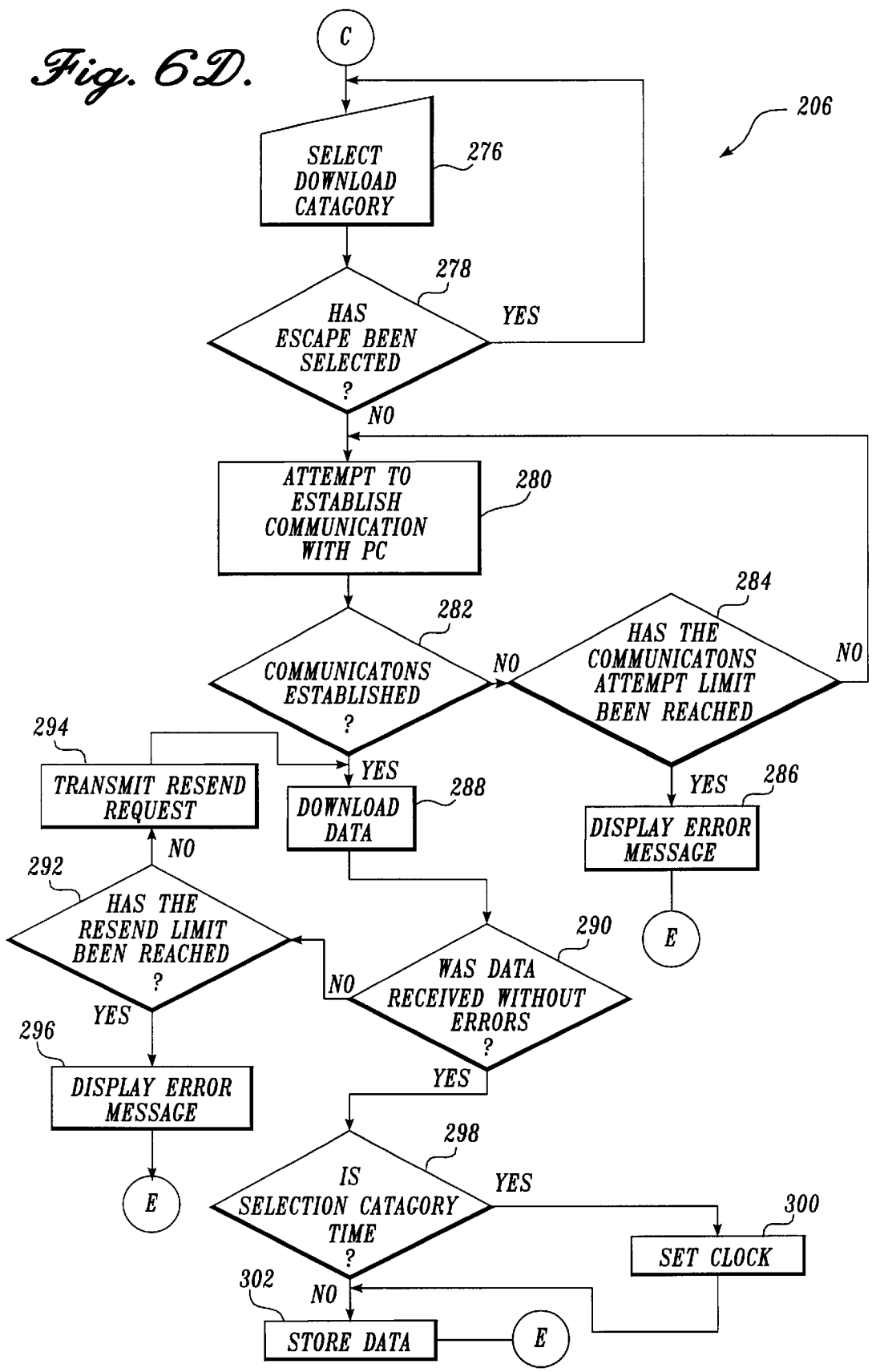
Figure 6F:
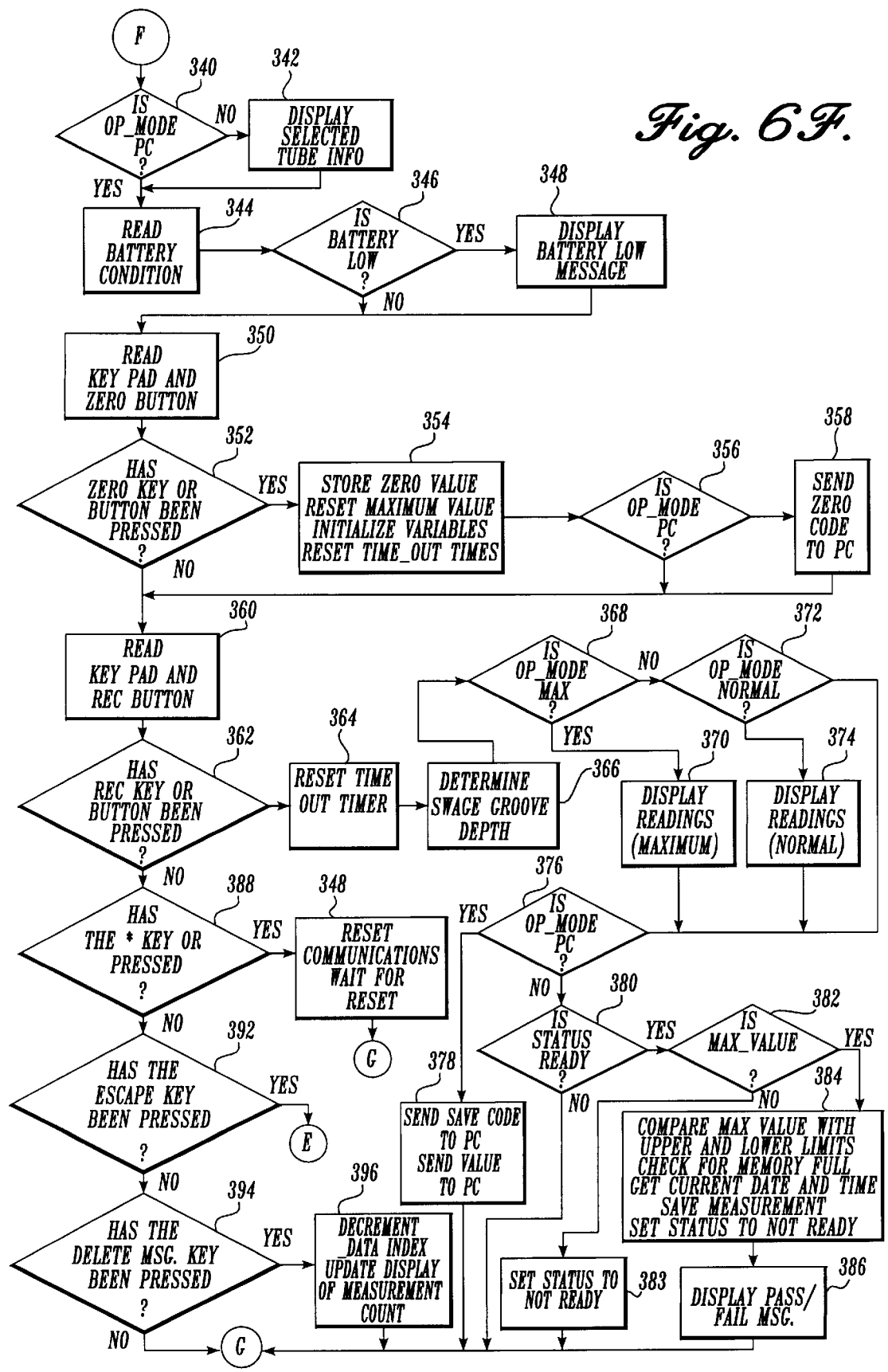
Figure 6G:
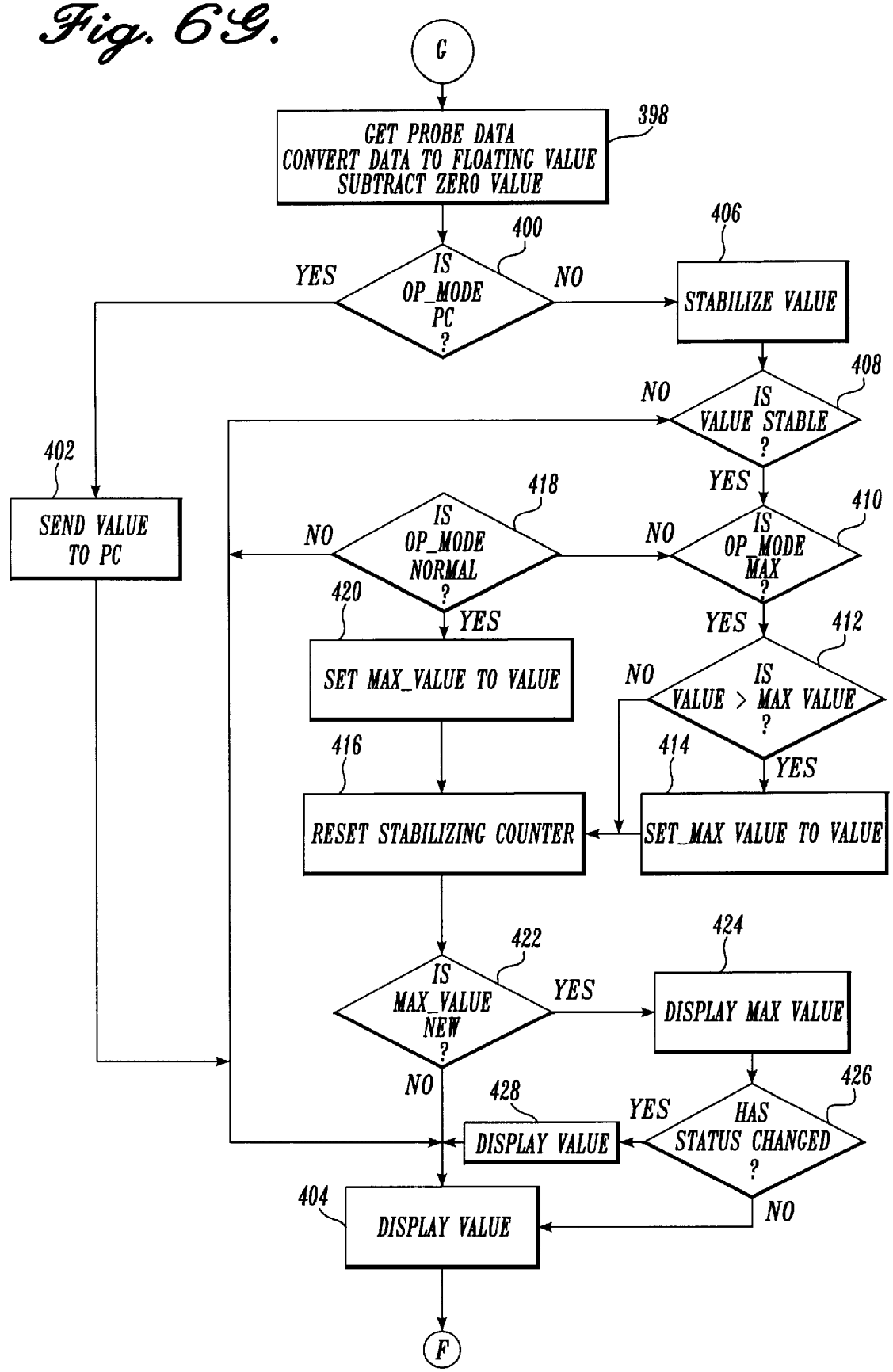

The preferred software routine includes the following subroutines: a main menu subroutine 200 (FIG. 6A); a run function menu subroutine 202 (FIG. 6B); an upload subroutine 204 (FIG. 6C); a download subroutine 206 (FIG. 6D); a setup subroutine 208 (FIG. 6E); and a run subroutine 210 (FIGS. 6F and 6G). Each subroutine will be discussed in turn.

Referring to FIG. 6A, the main menu subroutine begins at a block 212 at which the operator selects a function using the keypad 148. At a decision block 214, a determination is made whether the run function is selected. If the run function is selected, the preferred software routine continues to the run function menu subroutine 202 (FIG. 6B), from which the run subroutine 210 may be accessed. Both the run function menu subroutine 202 (FIG. 6B) and the run subroutine 210 will be discussed later. If the run function is not selected, a determination is made at a decision block 216 whether the upload function is selected. If the upload function is selected, the preferred software routine continues to the upload subroutine 204 (FIG. 6C), which will be discussed later. If the upload function is not selected, a determination is made at a decision block 218 whether the download function is selected. If the download function is selected, the preferred software routine continues to the download subroutine 206 (FIG. 6D), which will be discussed later. If the download function is not selected, a determination is made at a decision block 220 whether the setup function is selected. If the setup function is selected, the preferred software routine continues to the setup subroutine 208 (FIG. 6E), which will be discussed later. If the setup function is not selected, a determination is made at a decision block 222 whether a shutdown function is selected. If the shutdown function is selected, at a block 224 the system 30 is shut down. If the shutdown function is not selected, the preferred software routine returns to the block 212.

Referring now to FIG. 6B, a flowchart of the run function menu subroutine 202 is shown. The run function menu subroutine 202 is performed as a preliminary step before the run function subroutine 210 is performed. The run function menu subroutine 202 begins at a block 226 at which the operator selects a function. At a decision block 228, a determination is again made whether the run function is selected. If the run function is selected, the preferred software routine continues to the run function subroutine 210 (FIG. 6G), which will be discussed later. If the run function is not selected, a determination is made at a decision block 230 whether escape is selected. If escape is selected, the preferred software routine returns to the main menu subroutine 200 at the block 212 (FIG. 6A). If escape is not selected, a determination is made at a decision block 232 whether a tube select function is selected. If the tube select function is selected, at a block 234 the operator selects tube size from predetermined tube sizes, determined by inner diameter, that are stored in the memory 140. The tube size selected by the operator is used for a pass/fail determination, as will be discussed below. At a block 236 the selected tube size is set as the inner diameter of the tube to be tested, and the preferred software routine returns to the block 226.

If the tube select function is not selected, a determination is made at a decision block 238 whether an operator select function is selected. If the operator select function is selected, at a block 240 the operator selects an identification of the operator who performs the measurements. At a block 242, the identification of the operator is set, and the preferred software routine returns to the block 226. If the operator select function is not selected, then a determination is made at a decision block 244 whether a clear data function is selected. If the clear data function is selected, at a block 246 any measurements of swage groove depth that have been previously made are cleared from the memory 140. If the clear data function is not selected, the preferred software routine returns to the block 226.

Referring now to FIG. 6C, a flowchart of the upload subroutine 204 is shown. The upload subroutine 204 is performed when it is desired to upload measurement data to the optional computer 162 via the RS232 driver/receiver 158. The upload subroutine 204 begins at a block 248 at which the RS232 driver/receiver 158 is enabled and initialized. At a block 250, initialization data is sent to the optional computer 162. A determination is made at a decision block 252 whether the initialization data is received without error. For example, a checksum is suitably calculated and compared with a checksum calculated by the optional computer 162. If the initialization data is not received without error, then a determination is made at a decision block 254 whether a resend limit has been reached. A number of attempts to send initialization data without error may be limited because repeated, unsuccessful attempts to send initialization data may indicate that a hardware or software problem is present and should be corrected. A suitable resend limit is five attempts, but may be any number as desired. If the resend limit is not reached, the block 250 is repeated. If the resend limit is reached, at a block 256 a suitable error message is displayed on the display device 146 to alert the operator that the resend limit has been leached.

At a block 258, measurement data stored in the memory 140 is retrieved and sent to the optional computer 162 via the RS232 driver receiver 158. A determination is made at a decision block 260 whether the measurement data is received without error. The determination made at the decision block 260 is suitably made by comparison of a checksum, as discussed above for the decision block 252. If the data is not received without error, a determination is made at a decision block 262 whether a resend limit is exceeded. The resend limit is suitably the same resend limit used at the decision block 254, that is, five attempts to send measurement data without error, but may be any number as desired. If the resend limit is not reached, the block 258 is repeated. If the resend limit is reached, at a block 264 a suitable error message is displayed on the display device 146 to alert the operator that the resend limit has been reached. At a block 266, termination data is sent to the optional computer 162 via the RS232 driver receiver 158. A determination is made at a decision block 268 whether the termination data is received without error. The determination made at the decision block 268 is suitably made by comparison of a checksum, as discussed above for the decision blocks 252 and 260. If the data is not received without error, a determination is made at a decision block 270 whether a resend limit is reached. The resend limit is suitably the same resend limit used at the decision blocks 254 and 262, that is, five attempts to send measurement data without error, but may be any number as desired. If the resend limit is not reached, the block 266 is repeated. If the resend limit is reached, at a block 272 a suitable error message is displayed on the display device 146 to alert the operator that the resend limit is reached. At a block 274, the RS232 driver/receiver 158 is disabled and reset, and the preferred software routine returns to the block 212 of the main menu subroutine (FIG. 6A).

Referring now to FIG. 6D, a flowchart of the download subroutine 206 is shown. The download subroutine 206 is performed when it is desired to download data, such as tube data, operator data, or time data, from the optional computer 162 via the RS232 driver/receiver 158. At a block 276 the operator selects a category of data to download from the optional computer 162. A determination is made at a decision block 278 whether escape is selected. If escape is selected, the preferred software routine returns to the block 276. If escape is not selected, at a block 280 an attempt to establish communications with the optional computer 162 is made. At a decision block 282, a determination is made whether communications are established with the optional computer 162. If communications are not established, at a decision block 284 a determination is made whether a communications attempt limit is reached. The communications attempt limit is similar to the resend limit of the upload Fubroutine 204 (FIG. 6C). The communications attempt limit is suitably a limit of five attempts at establishing communications, although it will be appreciated that any desired number may be used. If the communications attempt limit is not reached, the preferred software routine returns to the block 280. If the communications attempt limit is reached, at a block 286 a suitable error message is displayed on the display device 146 and the preferred software routine returns to the block 212 of the main menu subroutine 200 (FIG. 6A). If communications are established, at a block 288 downloaded data is received from the optional computer via the RS232 driver/receiver 158. At a decision block 290, a determination is made whether the downloaded data is received without errors. The error checking determination used at the decision blocks 252, 260, and 268 (FIG. 6C), such as checksum comparison, is suitably used at the decision block 290.

If the downloaded data is not received without errors, then a determination is made at a decision block 292 whether a resend limit is reached. The resend limit used at the decision blocks 254, 262, and 270 (FIG. 6C), such as five attempts, is suitably used at the decision block 292. If the resend limit is not reached, at a block 294 a resend request is transmitted to the optional computer 162 and the preferred software routine returns to the block 288. If the resend limit is reached, at a block 296 a suitable error message is displayed by the display device 146 and the preferred software routine returns to the block 212 of the main menu subroutine 200 (FIG. 6A). If the downloaded data is received without errors, a determination is made at a decision block 298 whether the selected data category is time data. If the selected data category is time data, at a block 300 the clock 138 (FIG. 5) is set with the downloaded time data. The preferred software routine returns to the block 212 of the main menu subroutine 200 (FIG. 6A). If the selected data category is not time data, but instead is a category such as tube data or operator data, at a block 302 the downloaded data is stored in the memory 140. The preferred software routine returns to the block 212 of the main menu subroutine 200 (FIG. 6A).

Referring now to FIG. 6E, a flowchart of the setup subroutine 208 is shown. The setup subroutine 208 is performed when it is desired to set various parameters that will be discussed below. The setup subroutine 208 begins at a block 304, at which the operator selects a desired setup option. At a decision block 306, a determination is made whether sensitivity is selected. Sensitivity describes an amount of integration performed on a swage groove depth measurement that is to be displayed on the display device 146. The sensitivity parameter suitably includes three sensitivity settings: high, medium, and low. The high sensitivity setting results in a real-time display on the display device 146. The medium sensitivity setting integrates swage groove depth measurements at a first integration level. A suitable integration level for the medium sensitivity setting is five readings within ½ of ¹⁄₁₀₀₀ of an inch, although any number of readings may be selected as desired. A suitable integration level for the low sensitivity setting is ten readings within ½ of ¹⁄₁₀₀₀ of an inch, although any number of readings that is higher than the number for the medium setting may be used as desired. After the operator selects the desired sensitivity, a determination is made at a decision block 310 whether escape is selected. If escape is not selected, then the desired sensitivity selected by the operator is set at a block 312. The preferred software routine then returns to the block 304. If escape is selected, then the preferred software routine also returns to the block 304.

If sensitivity is not selected at the block 306, a determination is made at a decision block 314 whether precision is selected. The precision option is selected when it is desired to set the display precision by adjusting the number of digits displayed after the decimal point. If precision is selected at the decision block 314, the operator enters the desired display precision at a block 316. At a decision block 318, a determination is made whether escape is selected. If escape is not selected, then the desired precision, that is, the number of numerals after the decimal point to be displayed on the display device 146, is set at a block 320. The preferred software routine then returns to the block 304. If escape is selected at the decision block 318, then the preferred software routine also returns to the block 304.

When the precision option is not selected at the decision block 314, a determination is made at a decision block 322 whether an operation mode option is selected. The operation modes suitably include a personal computer (PC) mode, in which data is transferred to the optional computer 162 for processing using an alternative software routine, to be discussed later; a normal operating mode, in which the preferred software routine is used and the swage groove depth as measured is displayed on the display device 146; and a maximum (MAX) mode, in which the preferred software routine is used and in which the current swage groove depth and a maximum swage groove depth are both displayed on the display device 146. If the operating mode option is selected, at a block 324 the operator selects the operating mode. At a decision block 326, a determination is made whether escape is selected. If escape is not selected, at a block 328 the selected operation mode is set. The preferred software routine then returns to the block 304. If escape is selected at the decision block 326, the preferred software routine also returns to the block 304.

If the operating mode is not selected at the decision block 322, a determination is made at a decision block 330 whether a software installation option is selected. The software installation option is performed when it is desired to download software from the optional computer 162 to the processor subsystem 36. If the software installation option is selected, at a block 332 the operator enters a software installation password. A determination is then made at a decision block 334 whether escape is selected. If escape is not selected, at a block 336 the processor subsystem 36 accepts the software that is downloaded from the optional computer 162. The preferred software routine then returns to the block 212 of the main menu subroutine 200 (FIG. 6A). If escape is selected at the decision block 334, the preferred software routine also returns to the block 212 (FIG. 6A). If the software installation option is not selected at the decision block 330, a determination is made at a decision block 338 whether escape is selected. If escape is selected, the preferred software routine returns to the decision block 212 (FIG. 6A). If escape is not selected, the preferred software routine returns to the block 304.

Referring now to FIG. 6F, a flowchart of the run function subroutine 210 is shown. The run function subroutine 210 is the portion of the preferred software routine in which a determination is made of swage groove depth. The run function subroutine 210 begins at a decision block 340 in which a determination is made whether the operating mode is the PC mode. If the operating mode is not the PC mode, at a block 342 the selected tube information is displayed by the display device 146. At a block 344, condition of the battery 152 is sensed, such as by sensing voltage of the battery 152. When a determination is made at the decision block 340 that the operating mode is the PC mode, the preferred software routine also continues to the block 344. After the condition of the battery 152 is sensed at the block 344, a determination is made at a decision block 346 whether voltage of the battery 152 is below a predetermined threshold, such as about 5.8 volts. When the battery voltage is below the predetermined threshold, a suitable message is displayed on the display device 146.

At a block 350, the status of the first momentary-contact pushbutton switch 54 (FIG. 3) is sensed. When a determination is made at the decision block 346 that the battery voltage is not below the predetermined threshold level, the preferred software routine also proceeds to the block 350. At a decision block 352, a determination is made whether the first momentary-contact pushbutton switch is depressed. When the first momentary-contact pushbutton switch 54 is depressed, a value corresponding to the amplitude of the signal indicative of the inner diameter of the tube is stored in the memory 140. The value stored in the memory 140 is suitably referred to as a "zero" value. Thus, the zero value is stored in the memory 140 when the switch that is suitably labeled as "ZERO" is depressed. Also, at the block 354, a maximum swage groove depth value is reset and a timeout timer is reset and then started. The timeout timer is suitably implemented in software. At a decision block 356, a determination is made whether the operating mode is the PC mode. When the operating mode is the PC mode, at a block 358, the zero value is sent to the optional computer 162 and the preferred software routine proceeds to a determination block 360.

At the determination block 360, the status of the second momentary-contact pushbutton switch 56 is determined. The preferred software routine proceeds to the block 360 when a determination is made at the decision block 356 that the operating mode is not the PC mode as well as when a determination is made at the decision block 352 that the first momentary-contact pushbutton switch 54 is not depressed. At a decision block 362, a determination is made whether the second momentary-contact pushbutton switch 56 is depressed. As will be discussed in detail below, the second momentary-contact pushbutton switch 56, suitably labeled "REC", is preferably depressed when the tip of the probe 40 (FIG. 4) is positioned within a swage groove, which is detected by tactile feedback provided to the operator. When the second momentary-contact pushbutton switch 56 (FIG. 3) is depressed, at a block 364 the timeout timer is reset and a value corresponding to the signal from the transducer 42 (FIG. 3) that is indicative of the inner diameter of the tube is stored in the memory 140. The value that is stored at the block 364 is suitably referred to as a recorded (REC) value.

At a block 366 a determination of swage groove depth is made, and the current swage groove depth is displayed on the display device 146. The swage groove depth is determined by determining a difference between the zero value and the REC value. At a decision block 368, a determination is made whether the operating mode is the MAX mode. When the operating mode is the MAX mode, at a block 370 both the swage groove depth most recently determined at the block 366 aid the maximum swage groove depth that has been determined since the block 354 was performed are displayed by the display device 146. The preferred software routine then proceeds to a decision block 376 at which a determination is made whether the operating mode is the PC mode. When a determination is made at the decision block 368 that the operating mode is not the MAX mode, a determination is made at a block 372 whether the operating mode is the normal mode. When the operating mode is not the normal mode, the preferred software routine proceeds to the decision block 376. When the operating mode is the normal mode, the swage groove depth is displayed by the display device 146 at a block 374.

When a determination is made at the decision block 376 that the operating mode is the PC mode, the REC value is sent to the optional computer 162 via the RS232 driver/receiver 158 at a block 378. The preferred software routine continues the run function subroutine 210 as shown in FIG. 6G, as will be discussed later.

When a determination is made at the decision block 376 that the operating mode is not the PC mode, at a decision block 380 a determination is made whether status of receipt of data is ready or not ready. A status of ready indicates that valid data is being read, and a status of not ready indicates that valid data is not being read. For example, a status of not ready may result when the first momentary-contact pushbutton switch 54 (FIG. 3), that is, the "zero" button, has not been depressed or when the RS232 driver/receiver 158 is not initialized. When status is not ready, the run function subroutine 210 continues as shown in FIG. 6G.

When status is ready, a determination is made at a decision block 382 whether the most recent maximum value of swage groove depth is greater than a predetermined threshold value that represents a minimum expected value of swage groove depth. A maximum value less than the threshold indicates a likely malfunction within the system 30 (FIG. 2). When the MAX value is not greater than the predetermined threshold value, at a block 383 status is set to not ready and the run function subroutine 210 continues as shown in FIG. 6G. When the MAX value is greater than the predetermined threshold, at a block 384 the MAX value is compared with predetermined upper and lower limits, a determination is made whether the memory 140 is full and the current swage groove depth measurement is saved in the memory 140, and status is set to not ready. At a block 386 a pass/fail message is displayed by the display device 146. That is, a pass message is displayed when the swage groove depth is within the upper and lower limits, and a fail message is displayed when the swage groove depth measurement is outside the upper and lower limits. The run function subroutine 210 then continues as shown in FIG. 6G.

Referring back to the block 362, when a determination is made that the second momentary-contact pushbutton switch 56 (FIG. 3) is not pressed, a determination is made at a decision block 388 whether a reset key is depressed on the keypad 148. The reset key is suitably any key on the keypad 148. When the reset key is depressed, at a block 390, communications are reset. When the reset key is not depressed, a determination is made at a decision block 392 whether escape has been selected. When escape is selected, the preferred software routine returns to the block 212 of the main menu subroutine 200 (FIG. 6A). When escape is not selected, a determination is made at a decision block 394 whether delete measurement is selected at the keypad 148. When delete measurement is selected, a data index counter is decremented and a display of the data index count is updated and suitably displayed by the display device 146. The run function subroutine 210 then continues as shown in FIG. 6G. When delete measurement is not selected, the run function subroutine 210 continues as shown in FIG. 6G.

Referring now to FIG. 6G, the run function subroutine 210 continues at a block 398 at which the signal from the transducer is converted to a floating value that is continuously updated and subtracted from the zero value to continuously determine swage groove depth. At a decision block 400, a determination is made whether the operating mode is the PC mode. When the operating mode is the PC mode, the current value of the swage groove depth determined at the block 398 is sent to the optional computer 162. The current value of the swage groove depth is also displayed by the display device 146 at the block 404, and the preferred software routine returns to the decision block 340 (FIG. 6F).

Referring back to the decision block 400, when the operating mode is not the PC mode, at a block 406 the value of the swage groove depth determined at the block 398 is stabilized. Swage groove depth is stabilized when a suitable number of consecutive swage groove depth values determined at the block 398 are within a predetermined band, such as about ±0.001 inch, for a predetermined number of readings. A suitable number of readings for stabilization is ten readings, and preferably five readings. However, it will be appreciated that any number of readings may be used as desired.

At a decision block 408, a determination is made whether the value is stable as described above. When the value is not stable, the run function subroutine 210 continues at the block 404. When the value is stable, a determination is made at a decision block 410 whether the operating mode is the MAX mode. When the operating mode is the MAX mode, a determination is made at a decision block 412 whether the most recent value of swage groove depth as determined at the block 398 is greater than the current maximum value. When the most recent value of swage groove depth is greater than the current maximum value, the maximum value is set to the most recent value of swage groove depth determined at the block 398. At a block 416, a stabilization counter is reset. Referring back to the decision block 410, when the operating mode is not the maximum mode, at a decision block 418, a determination is made whether the operating mode is the normal mode. When the operating mode is not the normal mode, the run function subroutine 210 continues to the block 404. When the operating mode is the normal mode, at a block 420 the maximum value is set to the most recent value of swage groove depth determined at the block 398. The run function subroutine 210 then continues to the block 416.

At a decision block 422, a determination is made whether the current maximum value is a new maximum value. When the current maximum value is not a new maximum value, the run function subroutine 210 continues to the block 404. When the current maximum value is a new maximum value, the new maximum value is displayed by the display device 146 at a block 424. At a decision block 426, a determination is made whether the status of receipt of data has changed from the status determined at the block 380 (FIG. 6F). When the status has not changed, the run function subroutine 210 continues to the block 404. When the status is changed, the new status is displayed by the display device 146 at a block 428 and the run function subroutine 210 continues to the block 404. The run function subroutine 210 then continues back to the decision block 340 (FIG. 6F).

Alternative Software Routine

FIGS. 7A–7I are flowcharts of an alternative software routine according to the present invention. Referring now to FIGS. 5 and 7A–7I, the alternative software routine is stored in a nonvolatile portion of the memory 166 of the optional computer 162 and is executed by the CPU 164. Data processed by the optional computer 162, when the alternative software routine is executed, is serially transferred from the processor subsystem 36 via the RS232 driver/receiver 158. When the alternative software routine is being performed, user interfaces associated with the optional computer 162, such as a keyboard (not shown), a pointing device (not shown), and a monitor (not shown), function as user interfaces with the operator. The alternative software routine permits the system 30 to be particularly well suited for measuring swage groove depth in a shop where the swaging process is performed. The alternative software routine permits additional functions to be performed that are not available with the preferred software routine, such as data entry and trend analysis.

The alternative software routine is suitably prepared in any acceptable programming language that may be executed by the CPU 164. For example, the alternative software routine is suitably a C++ routine and is suitably operated within a graphical user interface-type environment, such as Windows® or Windows® 95, available from Microsoft Corporation of Redmond, Wash. However, it will be appreciated that a person having skill in the art can use any acceptable programming language and operating system environment for the alternative software routine.

Figure 7A:
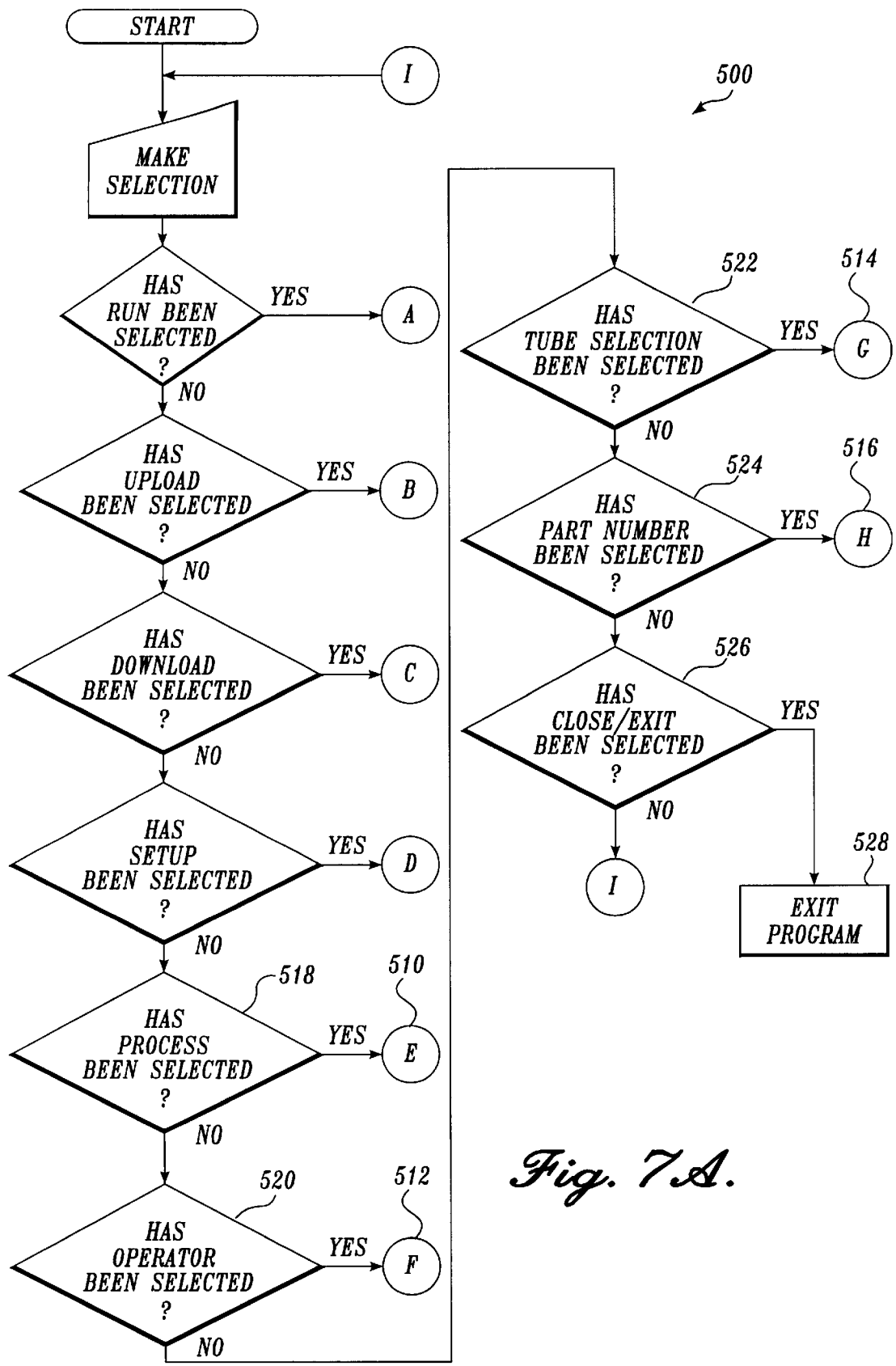
FIGS. 7A through 7I are flowcharts of an alternative software routine of the present invention.

The alternative software routine includes the following subroutines: a main menu subroutine 500 (FIG. 7A); a run function subroutine 502 (FIG. 7B); an upload subroutine 504 (FIG. 7C); a download subroutine 506 (FIG. 7D); a setup subroutine 508 (FIG. 7E); a process subroutine 510 (FIG. 7F); an operator function subroutine 512 (FIG. 7G); a tube function subroutine 514 (FIG. 7H); and a part function subroutine 516 (FIG. 7I).

Referring to FIG. 7A, a flowchart of the main menu subroutine 500 is shown. The main menu subroutine 500 is similar to the main menu subroutine 200 (FIG. 6A) for the preferred software routine. However, the main menu subroutine 500 includes decision blocks 518, 520, 522, and 524 at which determinations are made whether the process subroutine 510, the operator function subroutine 512, the tube function subroutine 514, or the part function subroutine 516 is selected, respectively. The main menu subroutine 500 also includes a decision block 526 at which a determination is made whether exiting the program is selected. When exiting the program is selected, at a block 528, the program is exited.

Figure 7B:
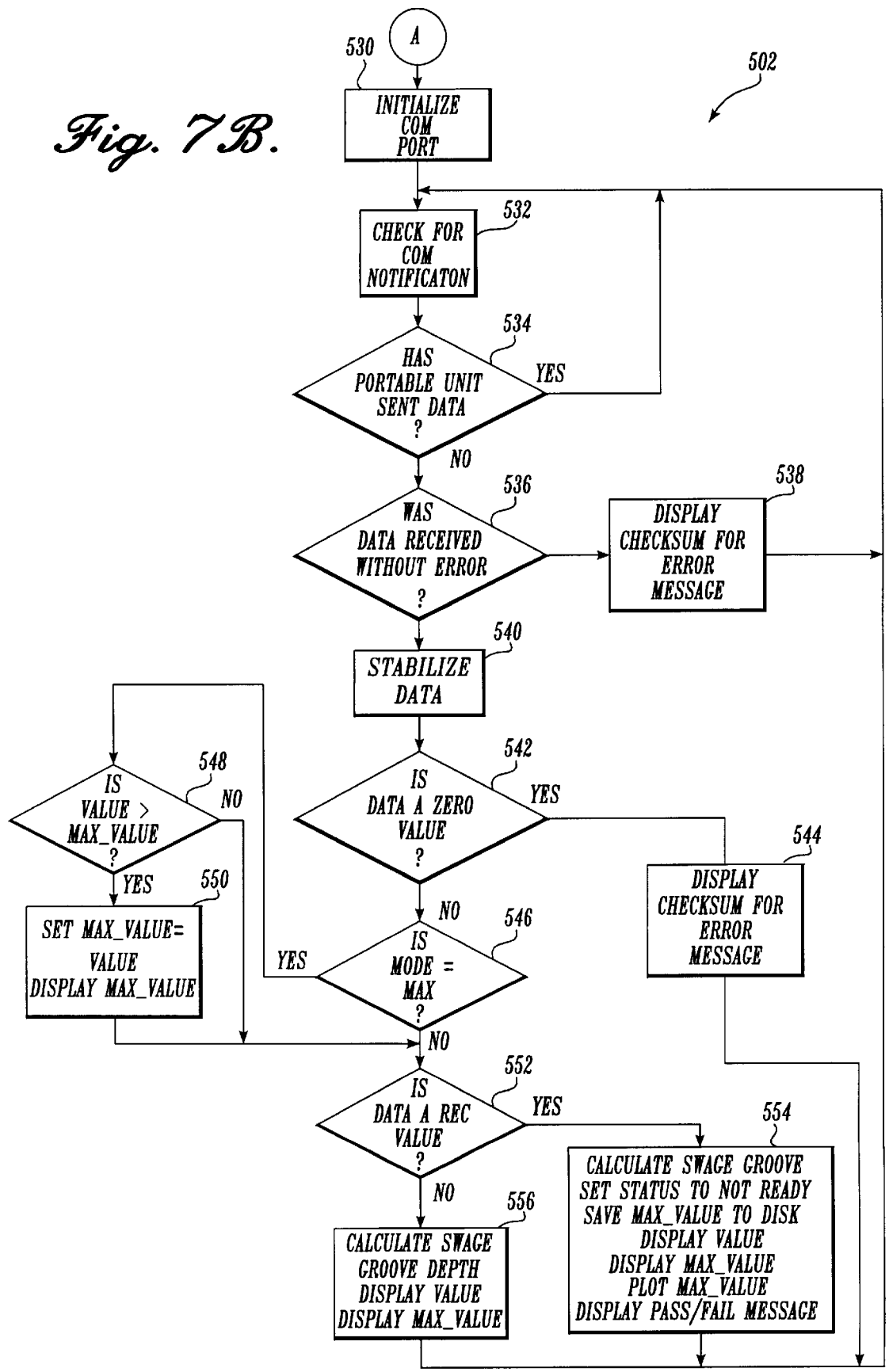

Referring now to FIG. 7B, a flowchart for the run subroutine 502 is shown. The run subroutine 502 begins at a block 530 at which the communications interface 168 is initialized. At a block 532, a check for notification of communications is made. At a decision block 534, a determination is made whether the processor subsystem 36 has sent data via the RS232 driver/receiver 158. When data is not sent, the alternative software routine returns to the block 532. When data is sent, a determination is made at a decision block 536 whether data is received without error. The determination is made in a similar manner as in the preferred software routine. When data is not received without error, a suitable error message is displayed at a block 538 and the alternative software routine returns to the block 532. When data is received without error, data is stabilized at a block 540 in a similar manner as in the preferred software routine.

At a decision block 542, a determination is made whether the data is a zero value. When the data is a zero value, at a block 544, status is set to ready, the zero value is displayed, and the MAX value is reset. The run subroutine 502 then returns to the block 532. When the data is not a zero value, at a decision block 546 a determination is made whether the mode is the MAX mode. When the mode is the MAX mode, at a decision block 548, a determination is made whether the value of the data is greater than the maximum value. When the value of the data is greater than the maximum value, at a block 550 the maximum value is set to the value of the data and, at a decision block 552, a determination is made whether the data is an REC value. Referring back to the decision block 546, when the mode is not the MAX mode, the alternative software routine proceeds to the decision block 552. Referring back to the decision block 548, when the value is not greater than the maximum value, the alternative software routine also proceeds to the decision block 552.

Referring now to the decision block 552, when the data is an REC value, at a block 554, status is set to not ready, swage groove depth is calculated as in the preferred software routine, the MAX value is saved in the memory 166 or in a suitable storage device, the value of the swage groove depth and the MAX value are displayed, maximum value is suitably plotted, and a pass/fail message is displayed as in the preferred software routine. The alternative software routine then returns to the block 532. When the data is not an REC value, at a block 556, swage groove depth is calculated as in the preferred software routine and the swage groove depth and the maximum value are displayed.

Figure 7C:
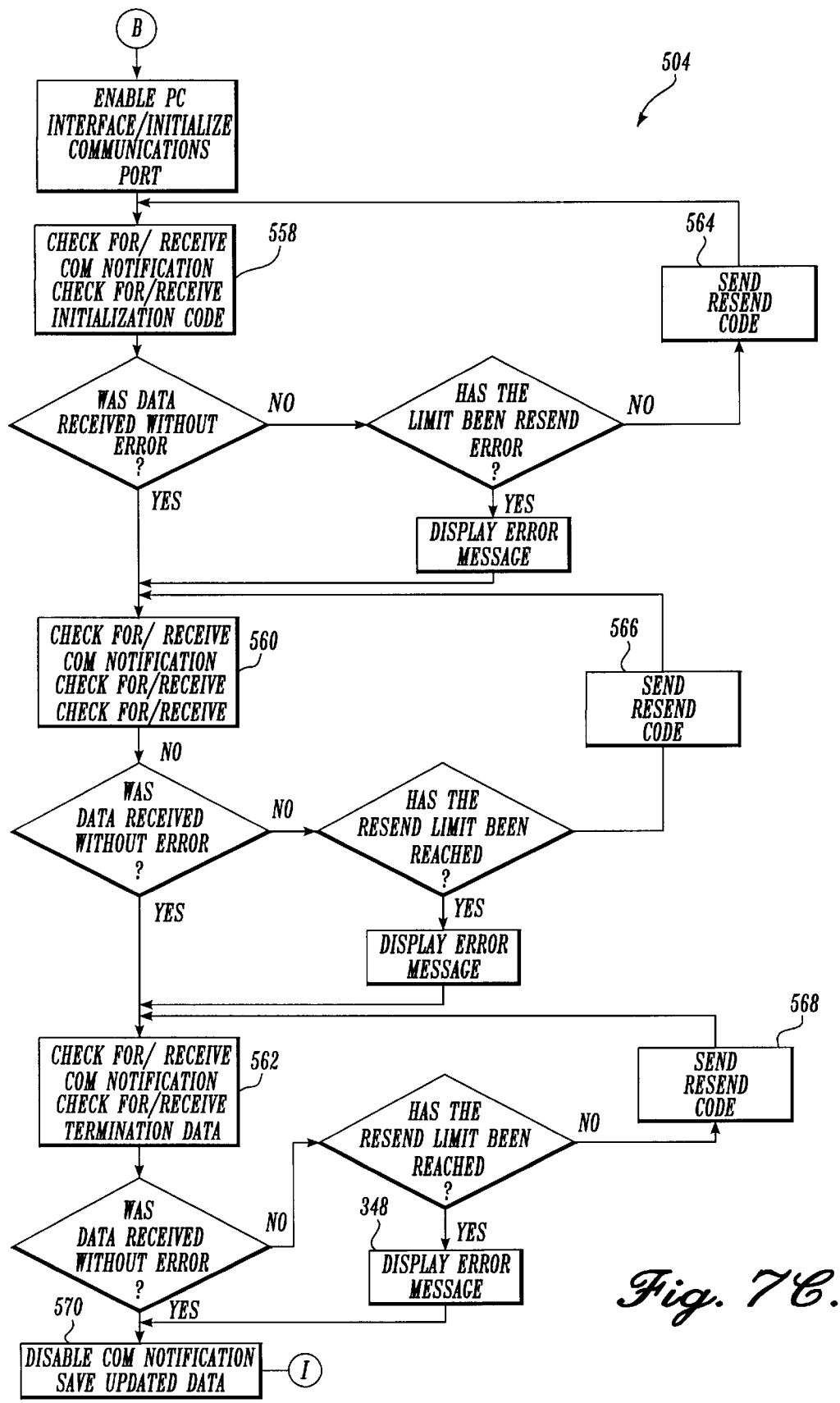

Referring to FIG. 7C, a flowchart of the upload subroutine 504 is shown. The upload subroutine 504 is similar to the upload subroutine 204 (FIG. 6C) in the preferred software routine. However, in the alternative software routine, initialization data, measurement data, and termination data are received instead of sent at blocks 558, 560, and 562, respectively. In addition, resend codes are sent at blocks 564, 566, and 568 when the resend limit is not reached for initialization data, measurement data, and termination data, respectively. Finally, at a block 570, uploaded data is saved in the memory 166 or in a suitable storage device.

Figure 7D:
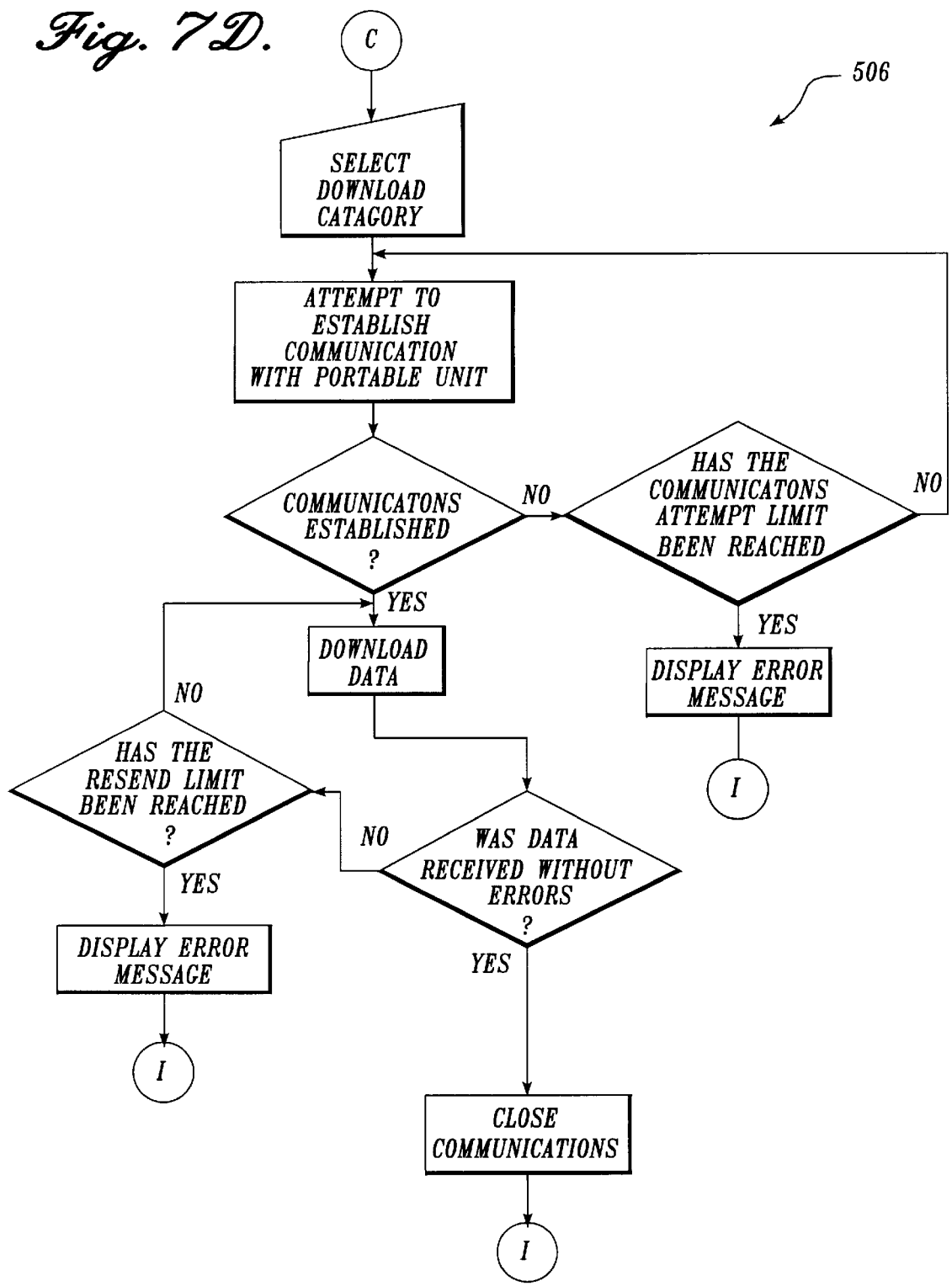

Referring now to FIG. 7D, a flowchart of the download subroutine 506 is shown. The download subroutine 506 is similar to the download subroutine 206 (FIG. 6D) for the preferred software routine. However, unlike the download subroutine 206 (FIG. 6D) for the preferred software routine, in the download subroutine 506 for the alternative software routine, no resend request is transmitted, no determination is made whether a selected category is time, no clock is set, and no data is stored.

Figure 7E:
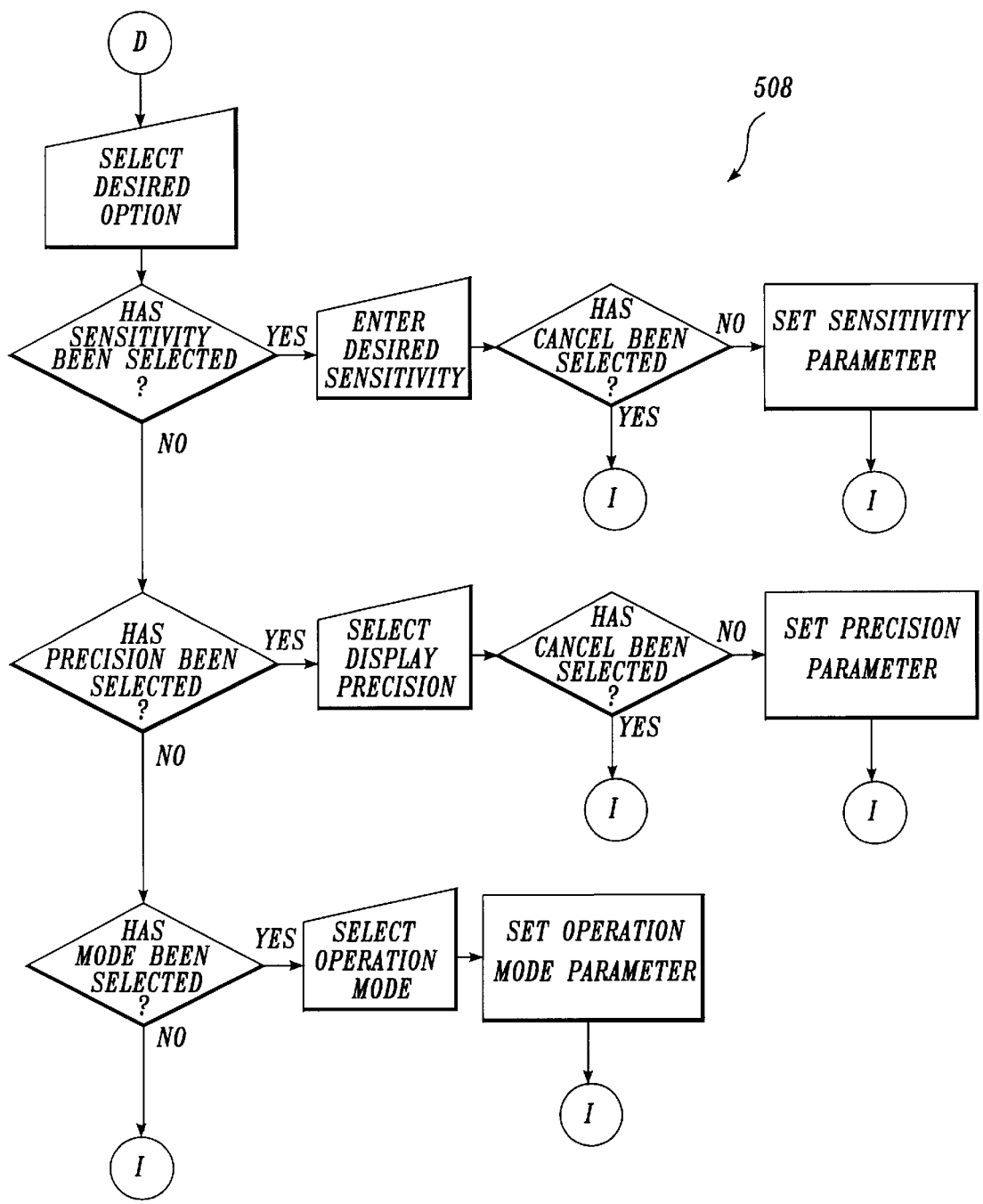

Referring now to FIG. 7E, a flowchart for the setup subroutine 508 is shown. The setup subroutine 508 is similar to the setup subroutine 208 (FIG. 6E) for the preferred software routine, except no software installation option is included in the setup subroutine 508 for the alternative software routine.

Figure 7F:
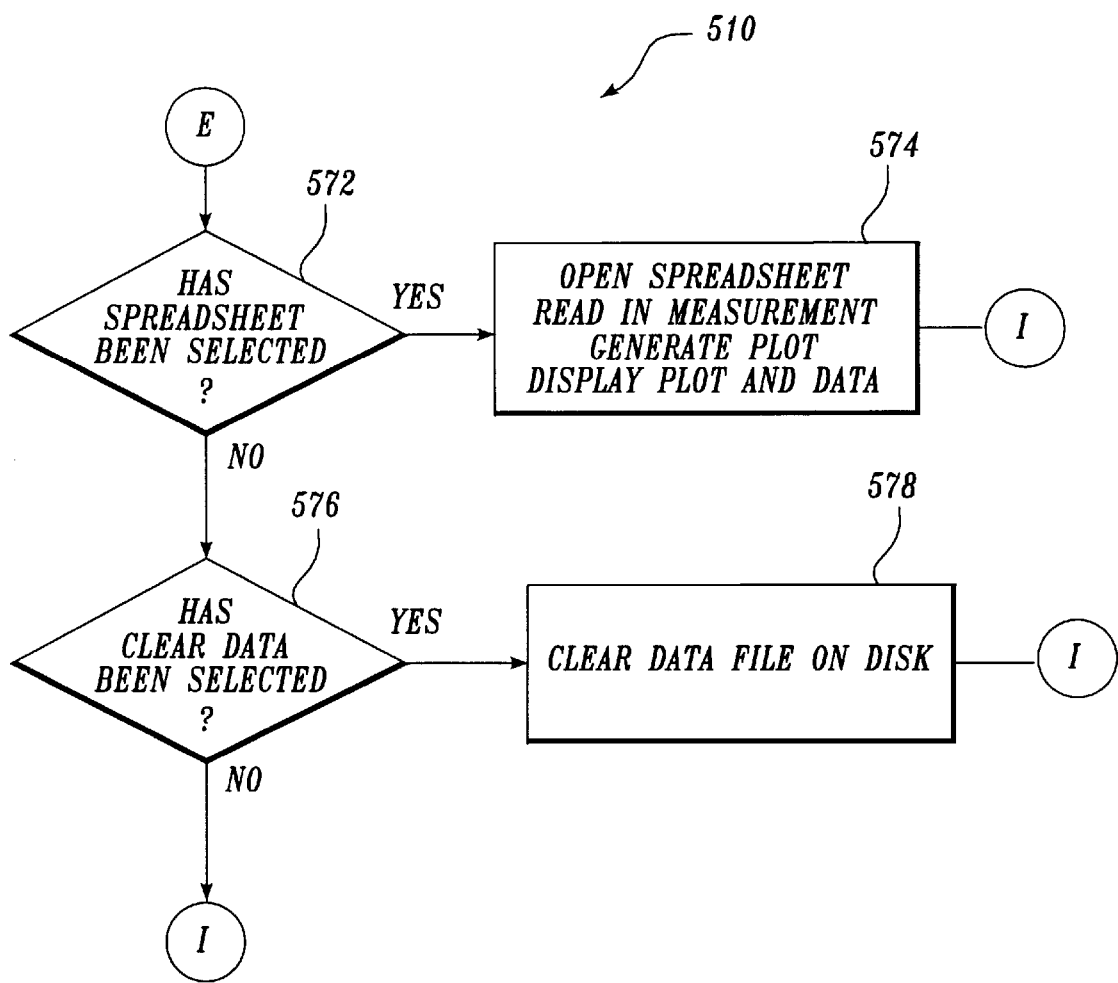

Referring to FIG. 7F, a flowchart for the process subroutine 510 is shown. At a decision block 572, a determination is made whether a spreadsheet function is selected. When the spreadsheet function is selected, a suitable spreadsheet application is opened, measurement data is imported and measurement data is plotted and displayed at a block 574. The alternative software routine 510 then returns to the main menu subroutine 500 (FIG. 7A). When the spreadsheet function is not selected, at a decision block 576, a determination is made whether a clear data function is selected. When the clear data function is not selected, the alternative software routine returns to the main menu subroutine 500 (FIG. 7A). When the clear data function is selected, at a block 578, data stored in the memory 166 or on a suitable storage device is cleared as desired, and the alternative software routine returns to the main menu subroutine 500 (FIG. 7A).

Figure 7G:
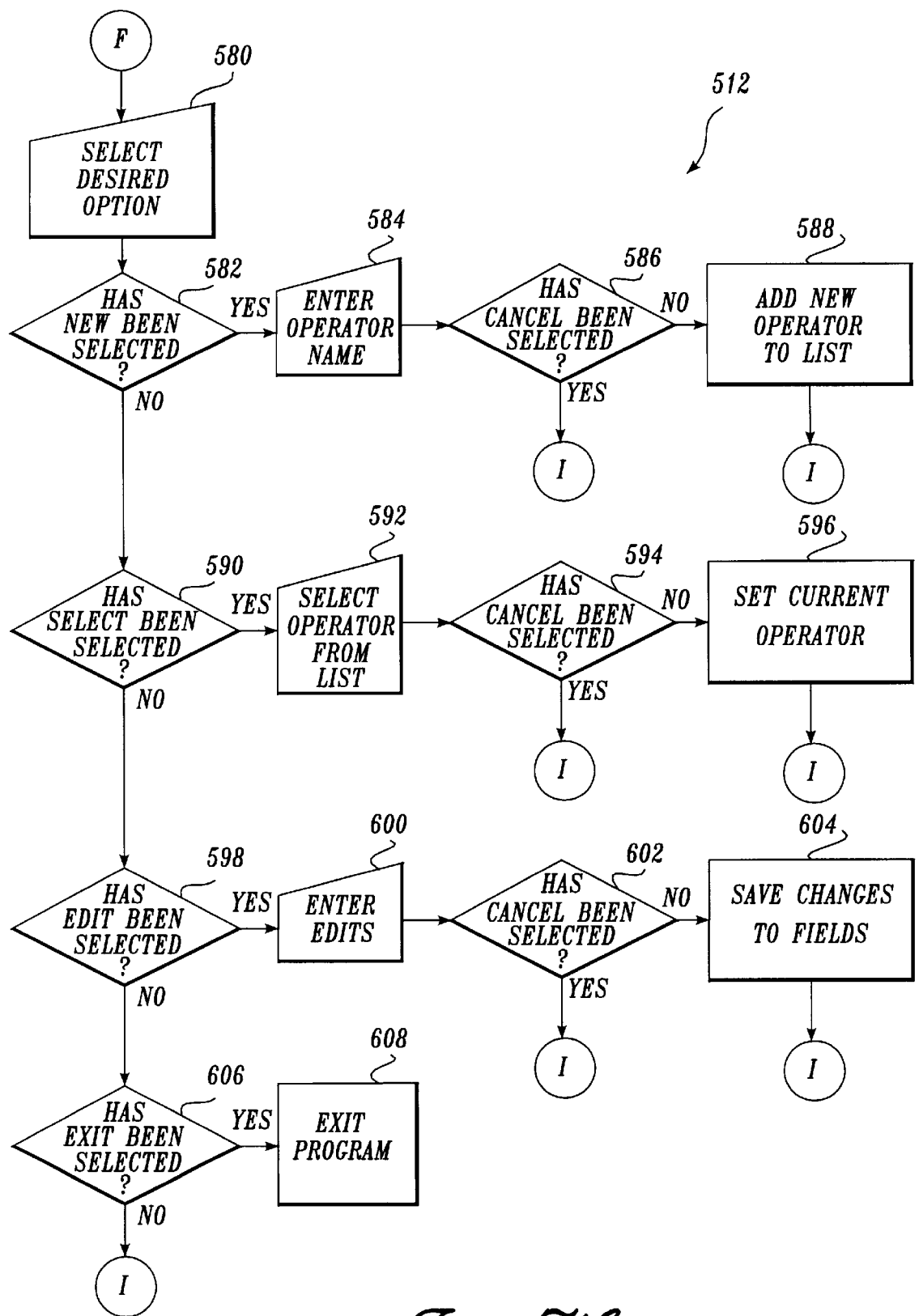

Referring to FIG. 7G, a flowchart for the operator function subroutine 512 is shown. At a block 580, the operator selects a desired option regarding operator information. At a decision block 582, a determination is made whether a new operator is selected. When a new operator is selected, at a block 584, the operator's name is entered. At a decision block 586, a determination is made whether cancel is selected. When cancel is selected, the alternative software routine returns to the main menu subroutine 500 (FIG. 7A). When cancel is not selected, at a block 588, the new operator is added to the list of operators and the alternative software routine returns to the main menu subroutine 500 (FIG. 7A).

When a new operator is not selected, at a decision block 590, a determination is made whether select operator is selected. When select operator is selected, at a block 592, the operator selects the name of the desired operator from the list.

At a decision block 594, a determination is made whether cancel is selected. When cancel is selected, the alternative software routine returns to the main menu subroutine 500 (FIG. 7A). When cancel is not selected, the selected operator is set as the current operator at a block 596, and the alternative software routine returns to the main menu subroutine 500 (FIG. 7A). When select operator is not selected, at a decision block 598, a determination is made whether edit is selected. When edit is selected, at a block 600, the operator enters desired edits. At a decision block 602, a determination is made whether cancel is selected. When cancel is selected, the alternative software routine returns to the main menu subroutine 500 (FIG. 7A). When cancel is not selected, at a block 604, the edits entered at the block 600 are saved and the alternative software routine returns to the main menu subroutine 500 (FIG. 7A). When edit is not selected, a determination is made at a decision block 606 whether exit is selected. When exit is selected, the program is exited at a block 608. When exit is not selected, the alternative software routine returns to the main menu subroutine 500 (FIG. 7A).

Figure 7H:
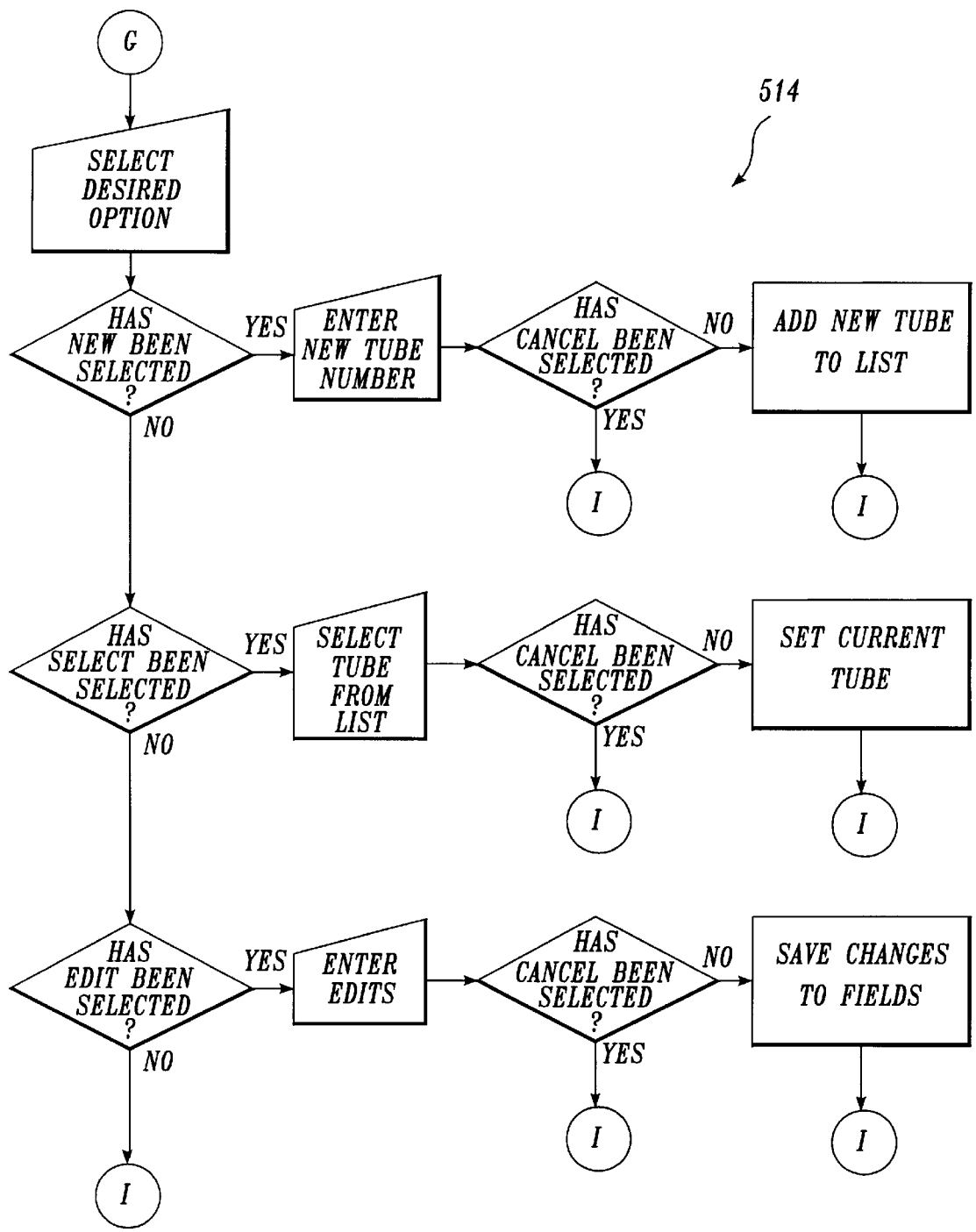
Figure 7S:
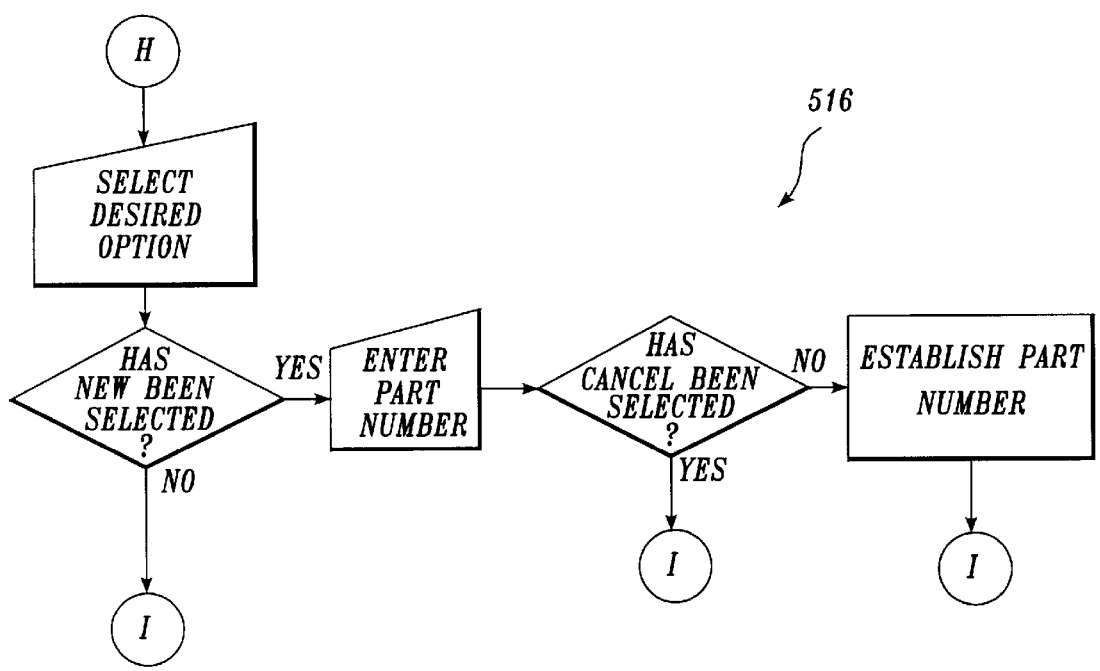

Referring to FIG. 7H, a flowchart for the tube function subroutine 514 is shown. The tube function subroutine 514 is similar to the operator function subroutine 512, except tube information is entered, selected, and edited rather than operator information.

Referring to FIG. 7I, a flowchart for the part function subroutine 516 is shown. The part function subroutine 516 is similar to the operator function subroutine 512 and the tube function subroutine 514, except that information regarding parts, such as couplings and unions, is processed rather than operator information or tube information.

Operation of an Exemplary Embodiment

As will be appreciated from the discussion that follows and with reference to FIGS. 3, 3A, 4, and 5, the probe subsystem 32 and the centering device 34 operate together to generate a signal that is indicative of the inner diameter of a tube under measurement, and the processor subsystem 36 processes the signal to produce a measurement of swage groove depth of a coupling under test.

Referring back to FIG. 3A, when it is desired to perform a nondestructive measurement of the swage groove depth of a coupling, an operator selects a probe 40 of an appropriate size for the desired tube and coupling. An appropriately sized probe is one wherein the diameter of the two semi-circular projections 92 is equalized with, or slightly smaller than, the inside diameter of the tube under test. For example, typical tube diameters range from 0.25 inch to 1.5 inches.

The operator selects a centering shaft 106 and a zeroing stop 108. It will be appreciated that the sizes of the centering shaft 106 and the zeroing stop 108 depend upon the tube size and the type of coupling used. For example, because a sleeve is typically longer than a union associated with the sleeve, the centering shaft 106 and the zeroing stop 108 for a sleeve are suitably longer than the centering shaft 106 and the zeroing stop 108 for an associated union. The operator slides the zeroing stop 108 onto the centering shaft 106, beginning with the second end 118 of the zeroing stop 108. The operator inserts the probe 40, with the cylindrical projection 94 first, through the centering shaft 106 and attaches to the probe 40 to the probe retaining cap 96 with the set screws 102. The tip 107 of the needle 104 is inserted through the bore of the probe retaining cap 96, in the end of the cylindrical projection 94, and into the channels 109. The probe retaining cap 96 is inserted onto the end cap 84 such that the needle 104 rests against the bellows-like tip 80 of the transducer 42. The probe retaining cap 96 is releasably attached onto the exterior surface of the bore 86 of the end cap 84.

Power is applied to the processor subsystem 36 by selecting an appropriate key on the keypad 148. The operator selects a desired subroutine function by depressing an appropriate key on the keypad 148. When it is desired to measure swage groove depth using the run subroutine 210 of the preferred software routine, the operator proceeds as follows. Referring to FIG. 6A, the operator selects the run function at the block 212. Referring to FIG. 6B, the operator selects tube and operator information as desired, and then selects the run function at the block 226.

Referring back to FIG. 3A, the operator fully inserts the probe 40 into the tube 20 until the first end 114 of the zeroing stop 108 abuts against the first end 22 of the tube 20. According to the present invention, the zeroing stop 108 is sized such that, when the probe 40 is fully inserted into the tube 20 and the first end 114 of the zeroing stop 108 abuts against the tube 20, the semicircular portions 92 of the probe 40 are located within an area of the tube 20 near the second end 14 of the coupling 10. At this area, the tube 20 has a substantially constant inner diameter. This provides a reference point, or "zero", for measuring swage groove depth A. Further, the centering shaft 106 extends through the tube 20 and maintains the relative orientation between the tube 20 and the probe 40. Thus, the centering shaft 106 helps maintain the semicircular portions 92 at a substantially normal orientation to the tube 20. This ensures repeatability and accuracy of swage groove depth measurements.

With the probe 40 completely inserted within the tube 20, the radial deflection of the semicircular portions 92 is translated to longitudinal movement of the needle 104 that is communicated to the transducer 42, and the transducer generates a signal having a magnitude that corresponds to the inner diameter of the tube 20. The signal is processed by the transducer demodulator circuit 124 and converted by the A/D converter 128. The digital signal is processed by the CPU 136 as determined by the preferred software routine. The operator depresses the first momentary-contact pushbutton switch 54 (FIG. 3), suitably labeled "ZERO". This operation is referred to as "zeroing". Referring now to FIG. 6F, when the system 30 is zeroed, the zero value is stored at the block 354.

Referring back to FIG. 3A, the operator retracts the probe 40 toward the first end 22 to the tube 20 until the semicircular portions 92 are located within the swage groove 24, as communicated to the operator by tactile feedback. The semicircular projections 92 are radially deflected away from each other by longitudinal movement of the needle 104 due to biasing by the bellows-like tip 80, and the transducer 42 generates a signal having a magnitude that corresponds to the inner diameter of the tube 20. The operator presses the zeroing stop 108 against the first end 22 of the tube 20. If desired, the zeroing stop 108 may be pressed against the first end 22 of the tube 20 by the biasing mechanism 119. This ensures that the zeroing stop 108 is aligned with the tube 20. The zeroing stop 108 and the centering shaft 106 coact with each other to keep the zeroing shaft 106 aligned with the tube 20. This in turn keeps the semicircular portions 92 maintained substantially normal to the tube 20. Thus, when the probe 40 is retracted, such that the semicircular portions 92 are positioned within the first swage groove 24, the centering shaft 106 and zeroing stop 108 cooperate to ensure semicircular portions 92 are maintained substantially normal to the tube 20, thus ensuring accuracy of swage groove measurements. Accuracy is thus ensured even if the operator retracts the semicircular portions 92 into the second swage groove 26.

The operator depresses the second momentary-contact pushbutton switch 56 (FIG. 3), suitably labeled "REC". Referring back to FIG. 6F, the REC value, that is, the digitized value of the magnitude of the signal from the transducer 42, is stored in the memory 140 at the block 364. The zero value is subtracted from the REC value at the block 366 to determine the swage groove depth. Swage groove depth is displayed on the display device 146 as discussed above.

When the operating mode is the MAX mode, the operator can determine the maximum swage groove depth. The operator can retract and further insert the probe 40 within the first swage groove 24, or the second swage groove 26 as desired, while observing the current and maximum swage groove depth readings on the display device 146. When the current swage groove depth reading that is displayed on the display device 146 exceeds the maximum swage groove depth reading on the display device 146, the operator depresses the second momentary-contact pushbutton switch 56 (FIG. 3), that is, the "REC" button, to store the swage groove depth reading.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An apparatus for nondestructively measuring swage groove depth of a swaged coupling for a tube, the tube having an inner surface with a first inside diameter at a first distance from a swaged end of the tube and a second inside diameter in a swage groove at a second distance from the swaged end of the tube, the first distance being greater than the second distance, the swage groove depth being the difference between the first inside diameter and the second inside diameter, the apparatus comprising:

a probe case having a first end and a second end;

a probe extending distally from the first end of the probe case, the probe having a probe tip that is arranged to contact the inner surface of the tube, the probe tip deflecting in response to changes in inner diameter of the tube;

a transducer coupled to the probe, the transducer generating a signal that is indicative of the inner diameter of the tube in response to deflection of the probe tip, the signal having a first magnitude when the probe tip is at the first distance and the signal having a second magnitude when the probe tip is in the swage groove at the second distance;

a centering device slidably received about the probe, the centering device including an elongated centering shaft having a first end adjacent to the probe case and a second end remote from the probe case, the centering shaft having an outer diameter only sligthtly less than the first inside diameter of the tube for being closely received within the tube to maintain the centering shaft aligned lengthwise coaxially with the tube, the probe tip projecting from the second end of the centering shaft, the centering device including a zeroing stop extending radially beyond the centering shaft between its first and second ends and of a diameter greater than the outside diameter of the tube, the zeroing stop being arranged to abut the tube when the probe is fully inserted into the tube such that the probe tip contacts the inner surface of the tube at the first distance;

means for recording the first magnitude of the signal, for recording the second magnitude of the signal and for determining the swage groove depth from a difference between the first and second magnitudes of the signal.

2. The apparatus of claim 1 wherein the transducer includes a linear variable differential transformer.

3. The apparatus of claim 1 wherein the probe includes a split-tip probe.

4. The apparatus of claim 1 further comprising a needle that is disposed between the probe and the transducer, the needle communicating deflection of the probe tip to the transducer.

5. The apparatus of claim 1 further comprising means for determining a maximum swage groove depth.

6. The apparatus of claim 1 wherein the centering device includes a zeroing stop that is a cylindrical plug that is slidably received about the centering shaft.

7. The apparatus of claim 1 further comprising a processor that is coupled to receive the signal that is indicative of the inner diameter of the tube.

8. The apparatus of claim 7 wherein the processor further includes a data interface.

9. The apparatus of claim 8 further comprising a computer that is electrically coupled to the data interface.

10. The apparatus of claim 7 further comprising:
a display device that is electrically coupled to the processor; and
a command entry device that is electrically coupled to the processor.

11. The apparatus of claim 10 further comprising a housing that houses the display device, the command entry device, and the processor.

12. The apparatus of claim 10 wherein the display device is a liquid crystal display.

13. The apparatus of claim 10 wherein the command entry device is a keyboard.

14. A method for nondestructively measuring swage groove depth of a swaged coupling for a tube, the tube having an inner surface with a first inside diameter at a first distance from a swaged end of the tube and a second inside diameter in a swage groove at a second distance from the swaged end of the tube, the first distance being greater than the second distance, the swage groove depth being the difference between the first inside diameter and the second inside diameter, the method comprising:

inserting a probe having a centering shaft of an outer diameter only slighltly less than the first inside diameter into the tube to maintain the centering shaft and the tube aligned coaixially, and continuing such inserting until a measuring tip of the probe projecting beyond an end of the centering shaft is at the first distance;

generating a first signal having a first magnitude that is indicative of the first inner diameter; recording a value of the first magnitude;

withdrawing the probe until the probe tip is within the swage groove at the second distance;

generating a second signal having a second magnitude that is indicative of the second inner diameter;

recording a value of the second magnitude; and determining swage groove depth by determining a difference between the values of the first and second magnitudes.

15. The method of claim 14 wherein inserting the probe into the tube is automatically stopped by a zeroing stop that is disposed between the tip of the probe and a probe case in which the probe is received.

16. The method of claim 14 further comprising determining a maximum swage groove depth.

17. The method of claim 16 wherein determining the maximum swage groove depth comprises:

generating a third signal having a third magnitude that is indicative of the inner diameter of the tube within the swage groove;

determining a difference between the third magnitude and the first magnitude; and comparing the difference between the third magnitude and the first magnitude with the difference between the second magnitude and the first magnitude, the maximum swage groove depth being the greater of the difference between the third magnitude and the first magnitude and the difference between the second magnitude and the first magnitude.

18. The method of claim 14, wherein the tube has an upper limit and a lower limit for swage groove depth, the method further including determining whether the swage groove depth is within the upper and lower limits.

19. The method of claim 18, further comprising inputting the tube diameter.

* * * * *

UNITED STATES PATENT AND TRADEMARK OFFICE
CERTIFICATE OF CORRECTION

PATENT NO. : 6,003,237            page 1 of 2
DATED : December 21, 1999
INVENTOR(S) : D.P. Sarr et al.

It is certified that error appears in the above-identified patent and that said Letters Patent is hereby corrected as shown below:

COLUMN    LINE

[56]    Refs. Cited    Insert following references in appropriate
       (U.S. Pats.)    patent order:

| | | |
|---|---|---|
| --4,112,355 | 09/05/1978 | Gibson, Jr. et al. |
| 4,754,551 | 07/05/1988 | Scott |
| 4,872,269 | 10/10/1989 | Sattmann |
| 4,907,345 | 03/13/1990 | Dall'Aglio et al. |
| 5,010,658 | 04/30/1991 | Griffith et al. |
| 5,063,687 | 11/21/1991 | Olshefsky |
| 5,157,845 | 10/27/1992 | Possati et al. |
| 5,189,808 | 03/02/1993 | Evans et al. |
| 5,424,639 | 06/13/1995 | Meiffren et al.-- |

UNITED STATES PATENT AND TRADEMARK OFFICE
CERTIFICATE OF CORRECTION

PATENT NO. : 6,003,237
DATED : December 21, 1999
INVENTOR(S) : D.P. Sarr et al.

It is certified that error appears in the above-identified patent and that said Letters Patent is hereby corrected as shown below:

| | | |
|---|---|---|
| Pg. 1, col. 1 | Attorney, Agent, or Firm | After "O'Connor" delete ";" |
| 23 (Claim 6, line 1) | 18 | In line 1, delete "centering device includes a" |
| 23 (Claim 6, line 2) | 18 | In line 2, delete "that is" and insert --includes-- |

Signed and Sealed this

Sixteenth Day of January, 2001

Attest:

Q. TODD DICKINSON

*Attesting Officer*   *Commissioner of Patents and Trademarks*